US011677842B2

(12) United States Patent
Zagat et al.

(10) Patent No.: US 11,677,842 B2
(45) Date of Patent: Jun. 13, 2023

(54) ENHANCED USER PROFILES WITHIN A COMMUNICATION PLATFORM

(71) Applicant: Salesforce, Inc., San Francisco, CA (US)

(72) Inventors: Edward Zagat, Menlo Park, CA (US); Neville Bowers, San Francisco, CA (US); Maxwell Hayman, Mill Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/334,128

(22) Filed: May 28, 2021

(65) Prior Publication Data
US 2022/0382820 A1    Dec. 1, 2022

(51) Int. Cl.
*G06F 16/9535* (2019.01)
*H04L 67/306* (2022.01)
(Continued)

(52) U.S. Cl.
CPC ........ *H04L 67/306* (2013.01); *G06F 16/9535* (2019.01); *G06F 16/9538* (2019.01);
(Continued)

(58) Field of Classification Search
CPC ............. G06F 16/9535; G06F 16/9538; G06F 16/9536; G06F 16/951; H04L 67/306
See application file for complete search history.

(56) References Cited

U.S. PATENT DOCUMENTS 9,792,457 B2 * 10/2017 Tung ................... G06F 21/6245
11,146,442 B1   10/2021 Harris
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Kris E Mackes
(74) *Attorney, Agent, or Firm* — Lee & Hayes, P.C.

(57) ABSTRACT

Techniques for providing an enhanced user profile to provide relevant information to a user requesting to view a user profile associated with another user. In an example, a first user submits a request to view a user profile associated with a second user. In response to receiving the request, the communication platform identifies one or more communication objects (e.g., communication channels, direct messaging instances, messages, threads, etc.) and/or one or more applications (third-party applications, first party applications, etc.) associated with the second user and/or the first user. The communication platform causes a display of indicator(s) associated with the communication object(s) and/or application(s) in association with the user profile, such as to enable efficient access to the associated communication object(s) and/or application(s). Additionally, the communication platform can identify additional contacts of the second user and/or inferred characteristics of the second user to present in association with the user profile.

20 Claims, 14 Drawing Sheets

(51) Int. Cl.
  *H04L 67/53* (2022.01)
  *H04L 67/60* (2022.01)
  *H04L 67/50* (2022.01)
  *G06F 16/9538* (2019.01)

(52) U.S. Cl.
  CPC ............ *H04L 67/53* (2022.05); *H04L 67/535* (2022.05); *H04L 67/60* (2022.05)

(56) References Cited

U.S. PATENT DOCUMENTS

| | | | |
|---|---|---|---|
| 2010/0218101 | A1 | 8/2010 | O'Shaughnessy et al. |
| 2014/0089816 | A1 | 3/2014 | DiPersia et al. |
| 2017/0235438 | A1 | 8/2017 | Atalla |
| 2018/0287982 | A1 | 10/2018 | Draeger et al. |
| 2018/0359325 | A1 | 12/2018 | Brezina et al. |

OTHER PUBLICATIONS

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2 013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—a New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 17/334,262, dated Oct. 26, 2021, Zagat, "Application Integration Into User Profiles Within a Communication Platform", 8 pages.

\* cited by examiner

```
┌─────────────────────────────────────────────────────────────┐
│ RECEIVE, FROM A CLIENT ASSOCIATED WITH A FIRST USER ACCOUNT OF A │
│ COMMUNICATION PLATFORM, A REQUEST TO VIEW A USER PROFILE     │
│ ASSOCIATED WITH A SECOND USER ACCOUNT OF A SECOND USER OF THE │
│ COMMUNICATION PLATFORM                                       │
│ 502                                                          │
└─────────────────────────────────────────────────────────────┘
                              │
                              ▼
┌─────────────────────────────────────────────────────────────┐
│ IDENTIFY, BASED ON THE REQUEST AND INTERACTION DATA ASSOCIATED WITH │
│ ONE OF THE FIRST USER ACCOUNT OR THE SECOND USER ACCOUNT, AN │
│ OBJECT ASSOCIATED WITH THE COMMUNICATION PLATFORM            │
│ 504                                                          │
└─────────────────────────────────────────────────────────────┘
                              │
                              ▼
┌─────────────────────────────────────────────────────────────┐
│ CAUSE DISPLAY OF A USER PROFILE INTERFACE VIA THE CLIENT, THE USER │
│ PROFILE INTERFACE INCLUDING USER DATA ASSOCIATED WITH THE USER │
│ PROFILE AND AN INDICATOR ASSOCIATED WITH THE OBJECT          │
│ 506                                                          │
└─────────────────────────────────────────────────────────────┘
```

FIG. 5

ENHANCED USER PROFILES WITHIN A COMMUNICATION PLATFORM

TECHNICAL FIELD

Communication platforms are becoming increasingly more popular for facilitating work-related communications, such as for project collaboration within a single organization and across two or more organizations. When collaborating in small organizations or limited user groups, identifying other users and information about other users with whom a user is connected may not be overly challenging, given the limited number of other users. However, as organizations get larger and collaborative projects become more extensive, identifying relevant other users and information associated therewith can be increasingly more challenging.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates the user interface of FIG. 2A in which a communication object associated with the enhanced user profile is selected, and data associated therewith is presented.

FIG. 5 illustrates an example process for causing a display of an enhanced user profile of a user, as described herein.

DETAILED DESCRIPTION

Figure 1:
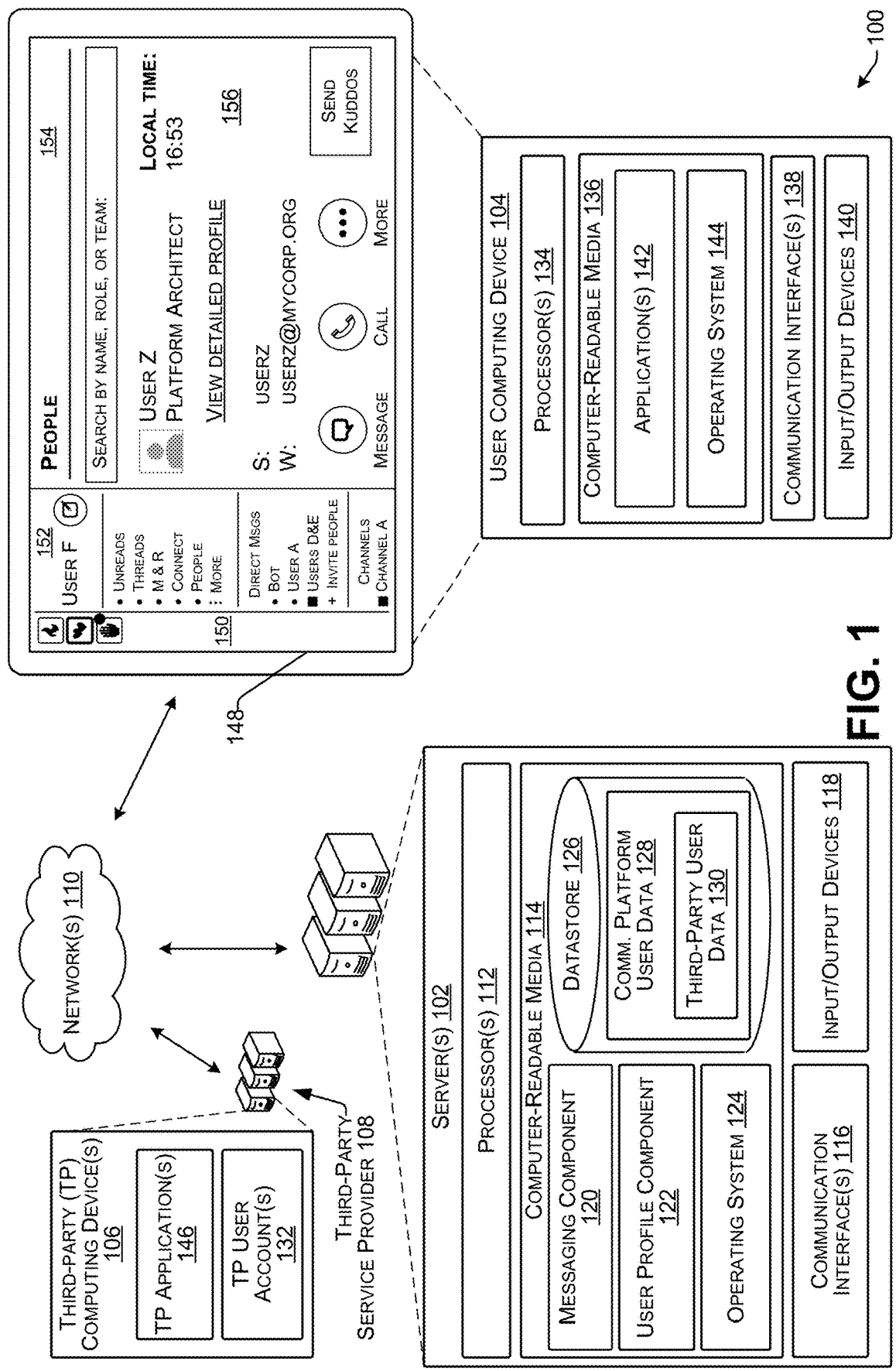
FIG. 1 illustrates an example system for performing techniques described herein.

Techniques for providing an enhanced user profile via a communication platform are described herein. The communication platform can be a group-based communication platform, a channel-based messaging platform and/or any other platform for facilitating communication between and among users. In an example, a first user of a first organization can utilize communication services available via the communication platform to communicate with other users of the first organization, as well as one or more users associated with other organizations with whom the first user has an established connection (e.g., in a contact list of the communication platform, previously communicated via a communication channel, direct messaging instance, in a social network, etc.). A particular user of the communication platform may have associated therewith a user profile including information associated with a particular user, contact information for connecting with the particular user, and the like.

In existing technologies, a first user can search for a second user in a database of a communication platform. If the second user is identified, the communication platform can cause basic information about the second user to be presented via a user interface. The basic information can include a name, title, and contact information, such as an email address or username associated with the communication platform. In some examples, the communication platform can provide an affordance to enable the first user to initiate a conversation with the second user, such as by clicking a link to send a message via the communication platform. As such, the first user, accessing a traditional user profile, may be informed as to basic information about the second user. To identify additional information, the first user utilizing the traditional system would be required to either send messages inquiring about the additional information or search through communication objects (e.g., communication channels, direct messaging instances, messages, threads, boards, audio and/or video communication interfaces, etc.) associated with the communication platform to identify the additional information. This is inefficient, computationally expensive, and provides a poor user experience.

Techniques described herein are directed to generating enhanced user profiles to provide additional relevant information (i.e., beyond that availed via the basic information described above) to a user requesting to view a user profile associated with another user. In at least one example, a first user can submit a request to view a user profile associated with a second user. The request can be submitted via a search function of the user interface, via an organization page, via a directory, by selecting an image, graphic, username, or the like associated with the second user, or the like. In response to receiving the request to view the user profile, the communication platform can identify user data associated with the second user. The user data can include a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. In at least one example, the communication platform can identify one or more communication objects, applications (e.g., third-party applications, first party applications, etc.), additional contacts of the second user (e.g., frequent communicators, collaborators, etc.), and/or inferred characteristics associated with the second user. In such examples, the communication platform can present the one or more communication objects, applications, additional contacts, and/or inferred characteristics in association with the user profile.

In various examples, the data (e.g., user data, communication object(s), application(s), additional contact(s), inferred characteristic(s), etc.) presented via a user profile interface associated with the second user can be determined based on user preferences of the second user. In such examples, the second user may determine an amount and/or type of information to be presented via the user profile interface. In some examples, the data presented via the user profile can be determined based on default settings of the communication platform. In such examples, an amount and type of the data presented can be determined based on the default settings. In some examples, the data presented via the user profile interface can be determined based on privileges of the first user to view the data. In some examples, the communication platform can receive the request to view the user profile of the second user and can identify the data associated with the second user. The communication platform can filter the data based on the privileges of the first user to view the data, and cause a presentation of relevant data that the first user is authorized to view.

In at least one example, the communication platform can be configured to identify one or more communication objects that are associated with the second user for presentation via the user profile. In some examples, the one or more communication objects can include communication objects that are most recently accessed, most recently contributed to, most frequently contributed to, most frequently accessed, designated favorite(s), and/or the like by the second user. In some examples, the communication object(s) can include those in which the first user and the second user are both associated. In some examples, the communication object(s) can include those in which the first user mentions (e.g., @mention) the second user one or more times, or vice versa. In some examples, the communication object(s) can include those in which the first user and/or the second user contributes more than a threshold number of times over a period of time. For example, an identified communication object can include a direct messaging instance in which the first user and the second user frequently transmit messages to one another.

In various examples, the communication platform can identify the communication object(s) that are relevant to the second user and/or the first user and can rank the communication object(s) in order of relevance. The relevance can include the recency of access (e.g., a period of time since last access, how recently the user accessed a communication object, etc.), recency of contribution (e.g., a period of time since the user contributed (e.g., transmitted a message, sent an attachment, reacted to a message, etc.) to a communication object, etc.), frequency of contribution, frequency of access, frequency of cross mentions (e.g., first user mentions second user, second user mentions first user, etc.), and the like. In at least one example, the communication platform can cause a presentation of a number of the top ranked communication object(s) via a user profile interface. In some examples, each of the communication object(s) presented via the user profile interface can include a link to the associated communication object. In such examples, the first user may quickly and efficiently access the relevant communication object via the link.

In some examples, the communication platform can provide a search option associated with the communication object(s) presented via the user profile interface. In at least one example, the search option can enable the first user to search one or more communication objects associated with the second user to identify a particular communication object of interest to the first user. In some examples, the search option can enable a search of the communication object(s) by keyword, by number, by identifier, or the like. For example, the first user may recall having a conversation with the second user regarding a particular document that is relevant to a collaborative project between the first user and the second user. However, the first user may not recall the exact communication object in which the conversation took place. In lieu of searching through a plurality of communication objects with which the first user and second user are associated, the first user can access the user profile of the second user and input keywords associated with the particular document in the search option. The communication platform can search communication objects associated with the second user and can identify one or more communication objects in which the particular document is discussed. The communication platform can cause the identified communication object(s) to be presented via the user profile, thereby expediting the identification of relevant information.

In at least one example, the communication platform can identify one or more applications that are associated with the second user for presentation via the user profile. The applications can include first-party applications that are associated with an organization of the second user and/or third-party applications that are accessible to the second user and/or the first user via the communication platform. In various examples, the communication platform can identify the application(s) based on frequency of interaction, recency of interaction, designated importance (e.g., flagged as urgent, important, etc.), or the like. In some examples, the communication platform can rank the application(s) based on interactions of the second user therewith, and can present one or more indicators associated with top ranked application(s) via the user profile interface.

In some examples, the communication platform can identify the application(s) based on a type of service provided by the application, such as a scheduling application, a work-related application, an organizational application (e.g., first party application), and the like. In such examples, the communication platform can cause one or more indicators associated with the applications to be presented based on the type of service provided thereby. For example, the communication platform can identify a third-party scheduling application associated with a second user account. The identification can be based on a determination that a third-party user account associated with the third-party scheduling application and/or third-party scheduling application data is stored in association with the second user account. The communication platform can cause data associated with the third-party scheduling application to be presented via the user profile, such as to enable the first user to schedule a meeting with the second user via the scheduling application without leaving a user profile interface of the communication platform.

In various examples, the indicator(s) associated with the applications can include links to access relevant application data associated therewith. For example, an indicator associated with a scheduling application can include a link to schedule a meeting via the application. For another example, an indicator associated with a service ticket generation application may include a link to a particular service ticket generated by the second user. For yet another example, an indicator associated with a customer relationship management tool may include a link to a customer account that is managed or otherwise associated with the second user.

In at least one example, the communication platform can identify one or more additional contacts (e.g., users) that are associated with the second user for presentation via the user profile interface. In some examples, the additional contacts can include other users of the communication platform with whom the second user frequently communicates. In such examples, the additional contacts may be identified based on a determination that a frequency of communication meets or exceeds a threshold amount of communication (e.g., daily communication, every other hour, etc.). In some examples, the additional contacts can include other users that share a team or group identifier with the second user. For example, the additional contact can include one or more team members with whom the second user is associated. In some examples, the additional contacts can include one or more other users who are in a superior/subordinate relationship with the second user. For example, the additional contact can include a manager of the second user. For another example, the additional contacts can include subordinates of the second user (e.g., a team of users that the second user manages). In some examples, the communication platform can provide a link to contact (e.g., send a message, call, initiate an audio or video conversation, etc.) with the second user and/or one or more additional contacts of the second user presented via the user profile interface.

In various examples, the communication platform can be configured to determine inferred characteristics associated with the second user. The characteristics can include a work-related expertise, personal interests (e.g., hobbies, events, processes of interest, etc.), and the like. In various examples, the communication platform can process communications transmitted via the communication platform between the second user and one or more other users, to determine context data associated therewith. The context data can include content, circumstances associated with the communications, other users associated with the communications, and the like. Based on the context data associated with one or more communications (e.g., a message, a conversation, etc.), the communication platform can infer characteristics of the second user. For example, the communication platform can determine that many different users ask the second user for advice on troubleshooting a particular type of software. The communication platform can determine that the second user has an expertise in the particular type of software and can cause a presentation of the inferred expertise in association with the user profile of the second user.

Techniques described herein provide an enhanced user profile via a communication platform, the enhanced user profile including information about an associated user account and corresponding interactions with the communication platform beyond that which is availed in current technologies. As discussed above, current user profiles provided by communication platforms can include basic user data associated with a user, such as a name, title, contact information, and various other pre-determined characteristics of a user. Accordingly, in current technologies, a user profile merely provides a general indication of who a particular user is and, in some cases, how to contact the particular user. Unlike the current technologies, the techniques described herein provide enhanced user profiles with relevant, real-time or near-real time interactive data corresponding to the particular user's interactions with the communication platform. In some examples, the interactive data can include interactions between the particular user and a viewing user (e.g., other user viewing the user profile of the particular user) via the communication platform.

As discussed herein, the interactive data can provide the viewing user with a means by which the viewing user may identify relevant data associated with the communication platform. By presenting the relevant data in association with a user profile of the particular user, the techniques described herein can reduce an amount of time necessary for the viewing user to identify particular data (e.g., a communication object, application, message, conversation, additional contacts, etc.) associated with the particular user. Accordingly, the techniques described herein may improve the functioning of the computing device and may increase network bandwidth, such as by reducing an amount of data transmitted in a search for the particular data.

While the description above describes providing relevant communication object(s), application(s), inferred expertise, and additional contacts of a user in association with a user profile of the user, this is not intended to be so limiting, and the techniques described herein can similarly be applicable to other data associated with the user, such as personality type, communication style, degree or level of workload (e.g., how busy the user is), and the like. For example, the communication platform can monitor a frequency of interaction and/or context of interactions of the user with the communication platform and can determine that the user is at a 95% workload. The communication platform can provide an indication of the workload via the user profile, such as to inform another user of the workload to prevent the other user from overloading the user with an additional question, project, or the like. As such, the techniques described herein are not limited to presenting data associated with the communication object(s), application(s), inferred expertise, and additional contacts.

Additionally, while the description describes accessing data associated with a particular user, techniques described herein can similarly be applicable data stored in association with a group of users, such as a workspace that includes two or more users. For example, a group of users associated with a workspace can have associated therewith a workspace profile including information associated with the workspace. The workspace profile can include user data associated with users of the workspace, communication object(s) associated with the workspace, application(s) associated with the workspace, inferred expertise of one or more users of the workspace, and additional contacts of users associated with another workspace. Responsive to receiving, from a user associated with the workspace or a user associated with another workspace, a request to view the workspace profile, the communication platform can cause the workspace profile to be presented via a user profile interface. In various examples, the communication platform may present data associated with the workspace profile based on the permissions of the requesting user. For example, the communication platform may present first data to a first user that is associated with the workspace and second data to a second user that is not associated with the workspace, based on the permissions of the second user. Accordingly, the techniques described herein can further be used to provide enhanced group profiles within a communication platform. Additional details and examples are described below with reference to FIGS. 1-12.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In various examples, each group can be associated with a workspace, enabling users associated with the group to chat, meet, call, collaborate, transfer files or other data, or otherwise communicate between or among each other in a secure and private virtual space. In some examples, members of a group, and thus a workspace, can be associated with a same organization. In some examples, members of a group, and thus a workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more third-party computing devices 106 associated with a third-party service provider 108 (e.g., third-party resource) via one or more network(s) 110. That is, the server(s) 102, the user computing device 104, and the third-party computing device(s) 106 can transmit, receive, and/or store data (e.g., content, information, or the like) using the network(s) 110, as described herein. The user computing device 104 and the third-party computing device(s) 106 can be any suitable type of computing device, e.g., portable, semi-portable, semi-stationary, or stationary. Some examples of the third-party computing device(s) 106 can include a server computing device, such as that described above with regard to the server(s) 102, a desktop computing device, a terminal computing device, or the like.

Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 110 are well known and are not discussed herein in detail.

In at least one example, the server(s) 102 can include one or more processors 112, computer-readable media 114, one or more communication interfaces 116, and input/output devices 118. Though not illustrated in FIG. 1, the third-party computing device(s) 106 can additionally include one or more processors, such as processor(s) 112, computer-readable media, such as computer-readable media 114, communication interface(s) 116, such as communication interface(s) 116, input/output devices, such as input/output devices 118.

In at least one example, each processor of the processor(s) 112 can be a single processing unit or multiple processing units and can include single or multiple computing units or multiple processing cores. The processor(s) 112 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media, which can program the processor(s) to perform the functions described herein.

The computer-readable media 114 can include volatile and nonvolatile memory and/or removable and non-removable media implemented in any type of technology for storage of data, such as computer-readable instructions, data structures, program modules, or other data. Such computer-readable media 114 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 114 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 114 can be used to store any number of functional components that are executable by the processor(s) 112. In many implementations, these functional components comprise instructions or programs that are executable by the processor(s) 112 and that, when executed, specifically configure the processor(s) 112 to perform the actions attributed above to the server(s) 102.

Functional components stored in the computer-readable media can optionally include a messaging component 120, a user profile component 122, an operating system 124, and a datastore 126.

In at least one example, the messaging component 120 can process messages between users. That is, in at least one example, the messaging component 120 can receive an outgoing message from a user computing device 104 and can send the message as an incoming message to a second user computing device 104. The messages can include messages sent via a communication object representative of a virtual space or a data route used for exchanging data, which can be text, audio, video, images, or the like. As used herein, a communication object can include a communication channel, a direct messaging instance, a message, a thread, a board, an audio or video communication interface, a workspace, or the like. For example, messages can include direct messages sent from an originating user to one or more specified users. For another example, communication channel messages can be sent via a communication channel from the originating user to the one or more users associated with the communication channel. The communication channel, or virtual space, can be a data route used for exchanging data between and among systems and devices associated with the communication platform. In at least one example, the messaging component 120 can establish a communication channel between and among various user computing devices, allowing the user computing devices to communicate and share data between and among each other. In at least one example, the messaging component 120 can manage such communications and/or sharing of data. In some examples, data associated with a communication channel can be presented via a user interface.

In various examples, the messaging component 120 can be configured to determine context data associated with one or more messages. The context data can include content, circumstances associated with the communications, other users associated with the communications, and the like. Based on the context data associated with one or more communications (e.g., a message, a conversation, etc.), the messaging component 120 can be configured to infer one or more characteristics associated with a user corresponding to the conversation, such as a sending user of a message. The characteristics can include a work-related expertise (e.g., skill, competence, proficiency, etc.), personal interests (e.g., hobbies, events, processes of interest, etc.), and the like. In various examples, the messaging component 120 can process the messages transmitted via the communication objects between users and determine characteristics associated with a particular user. In various examples, the messaging component 120 can be configured to provide the context data and/or the characteristics to the user profile component 122, such as for determining whether to present the characteristics via a user profile interface.

In at least one example, the messaging component 120 can be configured to identify one or more applications that are associated with messages transmitted via the communication platform. In some examples, the application(s) can include first party applications, such as those associated with an organization of a user, and/or third-party applications 146 managed by the third-party computing device(s) 106. In various examples, the messaging component 120 can identify an association with the message based on a link, attachment, or other indicator corresponding to the application being associated with the message. In various examples, the messaging component 120 can be configured to provide application data to the user profile component 122, such as to determine one or more relevant applications to include in association with a user profile and/or to present via the user profile interface.

The user profile component 122 can be configured to generate user profiles associated with users of the communication platform. A user profile can include user data associated with a particular user, such as a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. In at least one example, the user profile component 122 can identify one or more communication objects, applications (third-party applications, first party applications, etc.), additional contacts of the particular user (e.g., frequent communicators, collaborators, etc.), and/or inferred characteristics associated with the particular user for inclusion in the user profile.

In some examples, the user profile component 122 can be configured to generate an initial user profile. In some examples, the initial user profile can be generated based on user preferences associated with a particular user, default settings, organizational preferences, or the like. In various examples, the user profile component 122 can be configured to periodically update the user profile, such as daily, weekly, or the like. In some examples, the user profile component 122 can be configured to generate the initial user profile and update the user profile continuously, such as responsive to identifying a change to a user account associated with the particular user. In some examples, the user profile component 122 can be configured to update a user profile in response to receiving a request to view the user profile associated with the particular user.

In various examples, in response to receiving, from a first user, a request to view a user profile of a second user, the user profile component 122 can determine permissions associated with the first (e.g., requesting) user. The permissions can include permissions to access data associated with the second user. The permissions associated with the first user can be stored in association with a first user account in communication platform user data 128. In some examples, the permissions can be determined based on a group (e.g., organization, workspace, etc.) identifier that is associated with the first user and/or the second user. In some examples, the permissions can be determined based on work titles and/or positions associated with the first user and/or the second user. For example, the first user may be a manager of the second user. Based on the managerial position, the first user may have access to view data associated with the second user that other users may not.

In various examples, in response to receiving the request to view the user profile of the second user, the user profile component 122 can be configured to generate a user profile interface for presenting the user profile. In some examples, the user profile component 122 can determine data (e.g., user data, communication object(s), application(s), additional contact(s), inferred characteristic(s), etc.) to present via the user profile interface. The data can include user data, data associated with one or more communication objects, data associated with one or more applications, data associated with one or more additional contacts, and/or data associated with one or more inferred characteristics of the second user.

In at least one example, the user profile component 122 can be configured to identify one or more communication objects that are associated with the second user for presentation via the user profile interface. In some examples, the one or more communication objects can include communication objects that are most recently accessed, most recently contributed to, most frequently contributed to, most frequently accessed, designated favorite(s), and the like by the second user. In some examples, the communication object(s) can include those in which the first user and the second user are both associated. In some examples, the communication object(s) can include those in which the first user mentions (e.g., @mention) the second user one or more times, or vice versa. In some examples, the communication object(s) can include those in which the first user and/or the second user contributes more than a threshold number of times over a period of time. For example, an identified communication object can include a multi-party direct messaging instance in which the first user and the second user frequently transmit messages to one another.

In various examples, the user profile component 122 can identify the communication object(s) that are relevant to the second user and/or the first user and can rank the communication object(s) in order of relevance. The relevance can include the recency of access, recency of contribution, frequency of contribution, frequency of access, frequency of cross mentions (e.g., first user mentions second user, second user mentions first user, etc.), and the like. In at least one example, the user profile component 122 can cause a number of the top ranked communication object(s) to be presented via the user profile interface. In some examples, the number can include a pre-determined number of communication object(s). In some examples, the number can be dynamically determined, such as based on the ranking. In some examples, the number can be based on a score associated with a communication object of the communication objects. In such examples, the user profile component 122 can be configured to determine the score associated with the communication object, such as based on interaction data associated therewith (e.g., recency and/or frequency of contribution and/or access, etc.). In some examples, each of the communication object(s) presented via the user profile interface can include a link to view the associated communication object. In such examples, the first user may quickly and efficiently access the relevant communication object via the link.

In some examples, the user profile component 122 can provide a search option associated with the communication object(s) presented via the user profile interface. In at least one example, the search option can enable the first user to search one or more communication objects associated with the second user to identify a particular communication object of interest to the first user. In some examples, the search option can enable a search of the communication object(s) by keyword, by number, by identifier, or the like. For example, the first user may recall the second user mentioning a particular topic, but may not recall the exact communication object in which the topic was mentioned. In lieu of searching through a plurality of communication objects with which the first user and second user are associated, the first user can access the user profile of the second user and input keywords associated with the particular topic in the search option. The user profile component 122 can receive the search input and identify one or more communication objects associated with the second user and/or the first user in which the topic is discussed. The user profile component 122 can cause the identified communication object(s) to be presented via the user profile of the second user, thereby expediting the identification of relevant information. Such presentation of data can significantly reduce an amount of processing power and network bandwidth utilized in a search for a particular conversation. Accordingly, the techniques described herein can improve the functioning of at least the computing device of the first user and also increase an amount of network bandwidth that is available for other computing devices.

In at least one example, the user profile component 122 can identify one or more applications that are associated with the second user for presentation via the user profile interface. The applications can include first-party applications that are associated with an organization of the second user and/or third-party applications 146 that are accessible to the second user and/or the first user via the communication platform, such as those managed by third-party computing device(s) 106. In some examples, the user profile component 122 can determine interactions of the second user and/or the first user with the application(s) based on data provided by the messaging component 120, such as application data transmitted in association with one or more messages. For example, the messaging component 120 may send, to the user profile component 122, an indication that application data associated with an application was transmitted by the second user and/or the first user via a message.

In various examples, the user profile component 122 can be configured to identify user interactions and/or associations with applications via the communication platform. In such examples, the user profile component 122 can monitor and/or store data associated with the interactions and/or associations, such as for identifying one or more applications to include in the user profile interface. For example, the second user can provide information to the communication platform to associate a third-party scheduling application with the second user account of the communication platform. Such an association can facilitate scheduling appointments in association with the third-party scheduling application via a communication platform interface.

In various examples, the user profile component 122 can be configured to access third-party data associated with a third-party user account 132, such as via an API. In at least one example, the user profile component 122 can be configured to access data associated with the third-party user account 132 utilizing a SCIM API. In various examples, the user profile component 122 can store login information, one or more keys, tokens, or the like associated with the second user and the third-party user account 132, such as to enable access to the data. In various examples, the user profile component 122 can store the login information, key(s), token(s), and/or third-party user data in the datastore 126, such as in third-party user data 130.

In various examples, the user profile component 122 can identify the application(s) to present via the user profile interface based on interaction data and/or a level of importance associated with the application(s). In at least one example, the user profile component 122 can identify a particular application to present based on interaction data, such as a frequency of interaction and/or recency of interaction of the second user with the particular application. In some examples, the particular application may be identified based on a determination that a frequency of interaction is at or above a threshold frequency (e.g., more than twice per day, more than three times per week, etc.). In some examples, the identification may be determined based on the frequency of interaction being at or above the threshold frequency for a threshold amount of time (e.g., one week, one month, three months, etc.). In some examples, the particular application may be identified based on a determination that a recency of interaction is within a threshold amount of time (e.g., within the last 24 hours, within the last week, etc.).

In some examples, the user profile component 122 may be configured to determine a level of importance associated with an application. In some examples, the level of importance may be expressly indicated in association with the application, such as an application and/or application data that is marked as a favorite, as urgent, flagged as important, or the like. In some examples, the level of importance may be implied based on context data associated therewith. In some examples, the level of importance may be determined based on a number of users with whom the application data is shared, titles and/or positions associated with the users with whom the application data is shared, and the like. For example, the second user may share application data associated with a third-party application in a message to a chief executive officer. Based on the title of the recipient of the application data, the user profile component 122 may designate the application as having a high level of importance. In various examples, the user profile component 122 can cause a presentation of an indicator associated with the application on the user profile interface based on the level of importance associated therewith.

In various examples, the user profile component 122 can be configured to rank the one or more applications associated with the second user based on interactions and/or the level of importance. In some examples, the ranking may be determined based on an application type associated with the application. The application type can include a scheduling application, an analytics application, a development tool application, a collaboration tool application, an office management application, a support application, a social networking application, a mapping application, and/or any other type of application accessible via the communication platform. In some examples, the different application types may be ranked in order of importance, such as in a default setting, organizational preference associated with an organization of the second user, and/or a user preference associated with the second user, such as that stored in association communication platform user data 128. In some examples, the different application types may be ranked in order of frequency and recency of use, shared data between two users of the application, and keywords or other characteristics associated with the two user profiles and the application types.

In some examples, the ranking can be determined based on a user preference associated with particular applications. For example, the user preference can include a preference to present a scheduling application via the user profile interface, such as to enable another user to quickly and efficiently schedule meetings with the second user. As such, the user profile component 122 can rank the scheduling application above other applications associated with the second user. For another example, the user preference can include a preference to present indicators associated with in process service tickets associated with the second user and corresponding to a third-party service ticket generation application. In such examples, the third-party service ticket generation application can be ranked above other applications and indicators associated therewith may be presented via the user profile interface. In at least one example, the user profile component 122 can determine can cause a presentation of one or more indicators associated with top ranked application(s) via the user profile interface.

In various examples, the indicator(s) associated with the applications can include links to access relevant application data associated therewith. The application data can be stored in association with the third-party user data 130 and/or third party user account 132. For example, an indicator associated with a scheduling application can include a link to schedule a meeting via the application. For another example, an indicator associated with a service ticket generation application can include a link to a particular service ticket generated by the second user. For yet another example, an indicator associated with a customer relationship management tool can include a link to a customer account that is managed or otherwise associated with the second user.

In at least one example, the user profile component 122 can identify one or more additional contacts (e.g., users) that are associated with the second user for presentation via the user profile interface. In some examples, the additional contacts can include other users of the communication platform with whom the second user frequently communicates. In such examples, the user profile component 122 can identify the additional contacts based on a determination that a frequency of communication meets or exceeds a threshold amount of communication (e.g., daily communication, every other hour, etc.). In some examples, the additional contacts can include other users that share a team or group identifier with the second user. For example, the additional contact can include one or more team members with whom the second user is associated. In some examples, the additional contacts can include one or more other users who are in a superior/subordinate relationship with the second user. For example, the additional contact can include a manager of the second user. For another example, the additional contacts can include subordinates of the second user (e.g., a team of users that the second user manages). In some examples, the user profile component 122 can provide a link to contact (e.g., send a message, call, initiate an audio or video conversation, etc.) with the second user and/or one or more additional contacts of the second user presented via the user profile interface.

In various examples, the user profile component 122 can be configured to determine inferred characteristics associated with the second user. The characteristics can include a work-related expertise, personal interests (e.g., hobbies, events, processes of interest, etc.), and the like. As discussed above, the messaging component 120 can transmit messages sent via communication objects of the communication platform. The messaging component 120 can be configured to determine context data associated with each message of the messages. The context data can include content, circumstances associated with the communications, other users associated with the communications, and the like. In some examples, the messaging component 120 can be configured to determine the inferred characteristics associated with the second user based on the context data. In such examples, the messaging component 120 can provide the inferred characteristics to the user profile component 122, such as for presentation via the user profile interface. In some examples, the user profile component 122 can receive the context data from the messaging component 120 and can be configured to determine the inferred characteristics associated with the second user. For example, the messaging component 120 and/or the user profile component 122 can determine that many different users ask the second user for advice on troubleshooting a particular type of software. The messaging component 120 and/or the user profile component 122 can determine that the second user has an expertise in the particular type of software and can cause a presentation of the inferred expertise in association with the user profile of the second user, such as that stored as communication platform user data 128 in association with the datastore 126.

In some examples, the datastore 126 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, organization data stored in the datastore 126 can include discrete shards for each individual organization, including data related to a particular organization identification. For example, a database shard can store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual users can be associated with a database shard within the datastore 126 that stores data related to a particular user account. For example, communication platform user data 128 associated with a particular user account (e.g., a user profile) can be stored in a particular database shard. In some examples, third-party user data 130 associated with a particular user account can be associated with a database shard within the datastore 126. For example, third-party data obtained from a third-party service provider 108 can be associated with a database shard within the datastore 126.

In at least one example, the operating system 124 can manage the processor(s) 112, computer-readable media 114, and/or hardware, software, etc. of the server(s) 102.

The communication interface(s) 116 can include one or more interfaces and hardware components for enabling communication with various other devices (e.g., the user computing device 104, third-party computing device(s) 106, etc.), such as over the network(s) 110 or directly. In some examples, the communication interface(s) 116 can facilitate communication via Websockets, Application Programming Interfaces (APIs) (e.g., using API calls), HyperText Transfer Protocols (HTTPs), etc.

The server(s) 102 can further be equipped with various input/output devices 118 (e.g., I/O devices). Such I/O devices 118 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 112 and can be the same as or different than the processor(s) 112.

The computer-readable media 136 can comprise any of the types of computer-readable media 136 described above with reference to the computer-readable media 114 and can be the same as or different than the computer-readable media 114. Functional components stored in the computer-readable media can optionally include one or more applications 142 and an operating system 144.

The application(s) 142 can include a mobile application, a web application, and/or a desktop application. In some examples, one or more of the application(s) 142 can include third-party applications 146, which can be provided by the third-party service provider(s) 108. In at least one example, at least one application 142 can be provided by the communication platform or which can be an otherwise dedicated application. In some examples, individual user computing devices associated with the system 100 can have an instance or versioned instance of the application(s) 142, which can be downloaded from an application store, accessible via the Internet, or otherwise executable by the processor(s) 134 to perform operations as described herein. That is, the application(s) 142 can be an access point, enabling the user computing device 104 to interact with the server(s) 102 to access and/or use communication services available via the communication platform. In at least one example, the application(s) 142 can facilitate the exchange of data between and among various other user computing devices, for example via the server(s) 102. In at least one example, the application(s) 142 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 148 is shown in FIG. 1. As illustrated in FIG. 1, the user interface 148 can present data associated with the communication platform, such as via a communication platform application 142. In various examples, the user interface 148 can be configured to present data associated with one or more communication channels, one or more direct messages and, in some examples, one or more workspaces. That is, in some examples, the user interface 148 can present messages sent via one or more communication channels and/or via direct message(s) in a single user interface so that the user (e.g., of the user computing device 104) can access and/or interact with data associated with the multiple channels and/or direct messaging instances that he or she is associated with and/or otherwise communicate with other users associated with the multiple channels and/or direct messaging instances. The communication channels and/or direct messaging instances can be internal to an organization of the user or externally shared (e.g., include users from two or more organizations, include a first user from a first organization and second user not associated with an organization). In at least one example, the user interface 148 can be configured to present data associated with a user profile, such as that described above.

In some examples, the user interface 148 can include a first region 150, or pane, that includes indicator(s) (e.g., user interface element(s) or object(s)) associated with workspace(s) with which the user (e.g., account of the user) is associated. In some examples, the user interface 148 can include a second region 152, or pane, that includes indicator(s) (e.g., user interface element(s) or object(s)) representing data with which the user (e.g., account of the user) is associated. Additional details associated with the second region 152 and indicator(s) are described below with reference to FIG. 2A.

In at least one example, the user interface 148 can include a third region 154, or pane, that can be associated with a user profile interface 156. The user profile interface 156 can include data associated with a selected user (illustrated as "User Z"). As discussed above, the data presented via the user profile interface 156 can include user data, indicator(s) associated with communication object(s), indicator(s) associated with applications, additional contacts of the second user, and/or inferred characteristics associated with the selected user. The user profile component 122 can determine the amount and type of data to present via the user profile interface 156. Additional details associated with the user profile interface 156 will be discussed below with respect to FIGS. 2A-4.

Additionally or alternatively, the third region 154 can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 154 can be associated with the same or different workspaces. That is, in some examples, the third region 154 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 154 presents data associated with multiple workspaces, at least some data can be associated with an indication of which workspace the data is associated with. Additional details associated with the user interface 148, and the third region 154 operating as a messaging region or messaging interface, are described below with reference to FIG. 2B.

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 110 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the application(s) 142, techniques described herein can be performed by any other component, or combination of components, which can be associated with the server(s) 102, the user computing device 104, or a combination thereof.

Figure 2A:
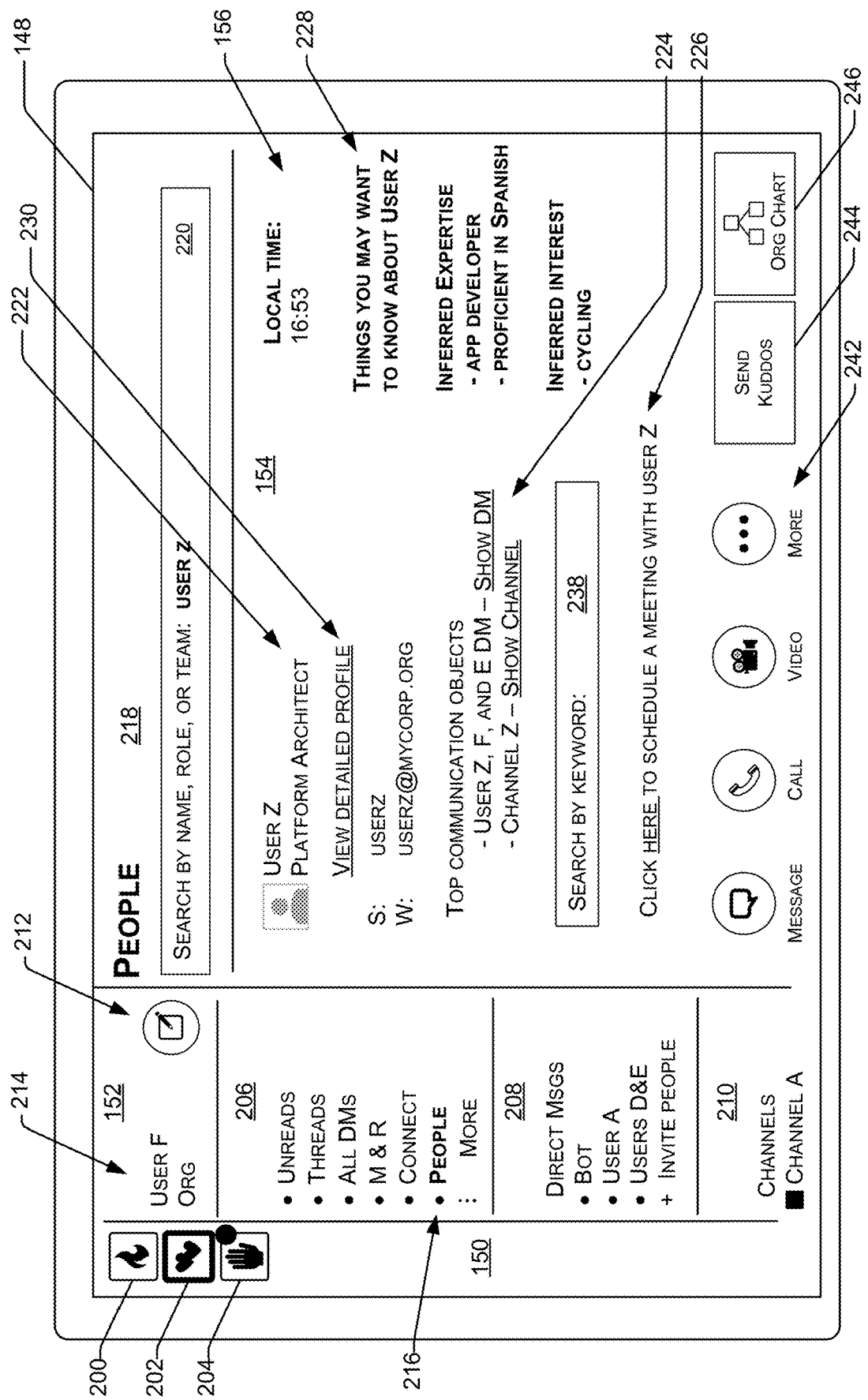
FIG. 2A illustrates an example user interface for enabling access to an enhanced user profile of another user, as described herein.

FIG. 2A illustrates additional details associated with the user interface 148 that presents data associated with a user profile interface, as described above with reference to FIG. 1.

As described above, in at least one example, the user interface 148 can include a first region 150, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 150. In at least one example, a user account of the user (e.g., User F) can be associated with group identifiers that correspond to each of the workspaces (e.g., as determined by the communication platform user data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 150. In some examples, some of the indicators associated with all of the workspaces with which a user is associated can be presented via the first region 150 and the user can interact with the user interface 148 to view additional or alternative indicators. In examples where fewer than all workspaces are represented via the user interface 148, the indicators can be arranged in alphabetical order, in an order of most recent interaction, in an order based on most frequent interaction, or some other order.

In some examples, the first region 150 may not be included in the user interface 148, and such information can be integrated into the user interface 148 via additional or alternative mechanisms.

In some examples, the user interface 148 can include a second region 152, or pane, that includes indicator(s) (e.g., user interface element(s) or object(s)) representing virtual space(s) associated with the workspace(s) with which the user (e.g., account of the user) is associated. In the illustrative example, the second region 152 can include a compose selectable option 212 that enables a user 214 (e.g., User F) to compose a message to another user. For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message can include any text, image, video, audio, or combination thereof provided by a user (using a user computing device). For instance, the user can provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers can comprise American Standard Code for Information Interchange (ASCII) text, a pointer, a memory address, or the like.

In at least one example, the second region 152 can include one or more sub-sections, or sub-panes, which can represent different virtual spaces. For example, a first sub-section 206 can include indicators representing virtual spaces that can aggregate data associated with a plurality of communication channels, workspaces, and/or directories. In at least one example, each virtual space can be associated with an indicator in the first sub-section 206. In some examples, an indicator can be associated with an actuation mechanism such that when actuated, can cause one of the one or more application(s) 142 (e.g., a communication platform application) to present data associated with the corresponding virtual space via the third region 154. In some examples, a virtual space can be associated with all unread data associated with each of the workspaces with which the user is associated. That is, in some examples, if the user requests to access the virtual space associated with "unreads," all data that has not been read (e.g., viewed) by the user can be presented in the third region 154, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In some examples, a virtual space can be associated with expediting communications between a user 214 of an organization and other users associated with other organizations that are different from the organization of the user 214 and/or individual accounts, such as those associated with user accounts that do not have an associated organization. For example, "connect" can be associated with enabling expedited communications with users of other organizations. In some examples, the "connect" virtual space can be associated with one or more channels and/or direct messaging instances that include a user from at least one other organization.

In at least one example, a virtual space can be associated with a directory of users. For example, the indicator 216 (illustrated as "people") may include a selectable option that is associated with the directory of users. The directory of users may include a directory of one or more users of an organization of the user (e.g., a same organization as User F) and/or one or more contacts associated with the user 214 who are associated with organizations that are different from the organization of the user 214 and/or are not associated with an organization (e.g., individual account). As will be discussed in greater detail below, in at least one example, responsive to receiving an indication of selection of the indicator 216, the communication platform can cause a directory interface 218 to be presented in the third region 154.

In at least one example, the second region 152 of the user interface 148 can include a second sub-section 208, or sub-pane, that includes include indicators representative of a first type of communication object. In the illustrative example, the first type of communication object includes direct messaging instances, such that the second sub-section 208 includes instances of communications with individual users or multiple specified users (e.g., instead of all, or a subset of, members of an organization). Such communications can be referred to as "direct messages." That is, the second sub-section 208, or sub-pane, can include indicators representative of virtual spaces that are associated with private messages between one or more users (e.g., direct messaging instances).

In addition to the second sub-section 208, the second region 152 can include a third sub-section 210, or sub-pane, that includes indicators representing a second type of communication object. In the illustrative example, the second type of communication object includes communication channels, which can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the third sub-section 210 can depict all communication channels, or a subset of all communication channels, that the user has permission to access (e.g., as determined by the permission data stored in association with communication platform user data 128). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-section 210 can depict all communication channels, or a subset of all communication channels, that the user is a member of, and the user can interact with the user interface 148 to browse or view other communication channels that the user is not a member of but are not currently displayed in the third sub-section 210. In some examples, different types of communication channels (e.g., public, private, shared, cross-workspace, etc.) can be in different sections of the third sub-section 210, or can have their own sub-regions or sub-panes in the user interface 148. For example, shared channels can be presented in association with the "connect" indicator illustrated in the first sub-section 206. In some examples, communication channels associated with different workspaces can be in different sections of the third sub-section 210, or can have their own regions or panes in the user interface 148.

Though illustrated as including the second sub-section 208 associated with a first type of communication object (e.g., direct messaging instances), and the third sub-section 210 associated with a second type of communication object (e.g., communication channels), this is not intended to be so limiting, and the second region 152 may include additional or alternative sub-regions, such as those associated with other types of communication objects. For example, in some examples, the second region 152 may include a fourth sub-region associated with boards, or virtual spaces associated with a particular type of collaboration. For another example, in some examples, the second region 152 may include a fifth sub-region associated with audio or video conversations, such as those that have recently taken place and/or are frequently accessed.

As described above, in at least one example, the user interface 148 can include a third region 154, or pane, for presenting data associated with the communication platform, such as user profile data, data associated with one or more communication channels, direct messaging instances, workspaces, boards, and the like. In at least one example, the third region 154 can present data that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 154 can be associated with a directory interface 218. That is, in some examples, the third region 154 can present data associated with searching for and identifying another user of the communication platform.

For example, in FIG. 2A, the user 214 can interact with the user interface 148 to view data associated with the directory interface 218, such as by selecting the indicator 216. In some examples, the directory interface 218 can provide a means by which the user 214 can quickly and efficiently identify another user of the communication platform. For example, the directory interface 218 can include a search mechanism 220 via which the user 214 can input a name (e.g., username, real name, nickname, etc.), role (e.g., position, title, etc.), team (e.g., group identifier, group name, etc.) associated with another user. In some examples, in response to receiving the input, the communication platform (e.g., the user profile component 122) can identify a user profile associated with the user. For example, as illustrated, the communication platform can receive an input of "User Z" via the search mechanism 220 and can identify a user profile associated User Z. In some examples, responsive to the input, the communication platform can cause the user profile to be presented via the user profile interface 156.

As discussed above, the user profile component 122 can determine the data to present via the user profile interface 156. In the illustrative example, the data includes user data 222, communication objects 224, application data 226, and inferred characteristics 228, however, this is not intended to be so limiting and the data may include additional or alternative data, such as that described herein. In various examples, the user profile can include user data 222. The user data 222 can include a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. In various examples, the user data 222 presented via the user profile interface 156 can include basic data to inform the requesting user 214 (e.g., User F) about the name, position, and contact information associated with the other user. In some examples, the user profile component 122 can include a selectable option 230 to enable the requesting user 214 to view a detailed user profile associated with the other user. In various examples, the detailed user profile can include additional user data associated with the user, such as an organizational chart associated with the user, schedule information, work location, and the like.

In the illustrative example, the communication objects 224 include a direct messaging instance and a communication channel, though this is not intended to be so limiting and the communication objects can include messages, threads, boards, audio and/or video communication interfaces, workspaces, and the like, with which the user is associated. In various examples, the communication objects 224 can include communication objects that are ranked the highest. That is, the communication object 224 presented via the user profile interface 156 can include those that are most relevant to the user associated with the profile and/or the requesting user 214. As discussed above, relevance can be based on recency of access, recency of contribution, frequency of contribution, frequency of access, frequency of cross mentions (e.g., User Z mentions User F, User F mentions User Z, etc.), and the like.

Figure 2B:
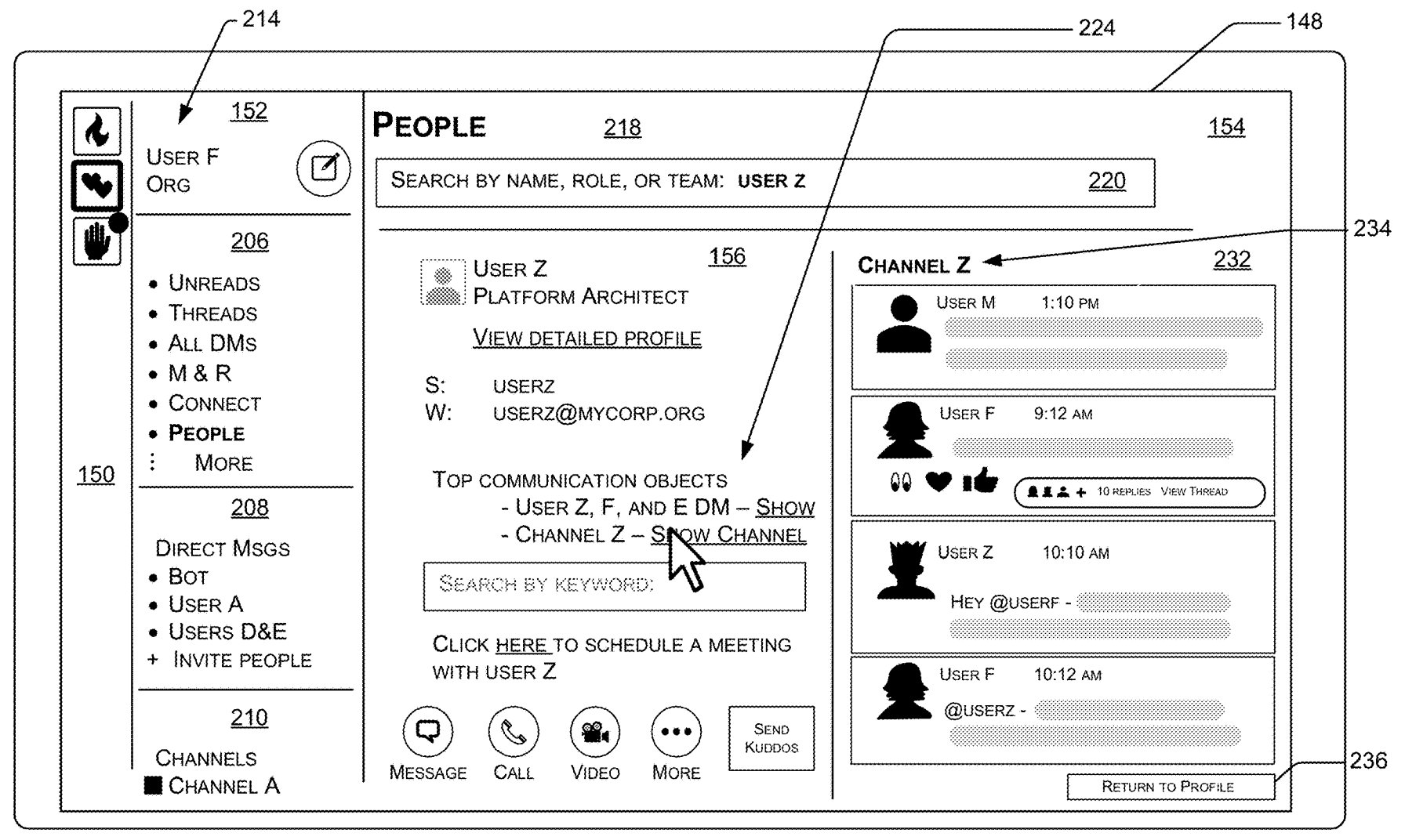

As illustrated, the communication objects 224 can include a selectable option to enable the requesting user 214 to quickly and efficiently access a particular communication object via the user profile interface 156. FIG. 2B illustrates the user interface of FIG. 2A in which a communication object associated with the enhanced user profile is selected, and data associated therewith is presented via the user interface 148. In the illustrative example, the user 214 selects a communication object ("Channel Z") and data associated with the communication object is presented in a sub-region 232 or pane of the third region 154, while the user profile interface 156 is additionally presented in the third region 154. In other examples, responsive to selection of the communication object, the communication platform may cause the data associated with the communication object to be presented across the third region 154.

In various examples, the communication platform may cause the most recent messages associated with the communication object to be presented via the sub-region 232. In such examples, the data associated with communication object can be presented in a normal messaging feed. In some examples, the communication platform may cause relevant messages associated with the requesting user 214 to be presented via the sub-region 232. In such examples, the communication platform may filter messages associated with the communication object to identify messages associated with the requesting user 214 and may cause the identified messages to be presented. For example, messages relevant to the requesting user may include messages in which the requesting user 214 is mentioned (e.g., @mention), in which the requesting user 214 mentions the other user, in which the requesting user 214 and the other user exchange data in a conversation (e.g., multiple messages received within a threshold time period), and the like.

In some examples, the sub-region 232 can include a selectable option to enable the requesting user 214 to navigate to the communication object. In some examples, the selectable option can be associated with the channel title 234, such that, in response to receiving an indication of selection of the communication object title, the communication platform can cause the communication object to be presented in its entirety in the third region 154. In such examples, the communication object may be presented as a messaging feed in the third region 154 without the user profile interface 156. In various examples, the sub-region 232 can include a selectable option 236 to enable the requesting user 214 to return to the user profile interface 156. In response to receiving a selection of the selectable option 236, the communication platform can cause the user profile interface 156 to be presented in the third region 154 without the communication object, such as that illustrated in FIG. 2A.

The user profile interface 156 illustrated in FIG. 2A includes an object search mechanism 238. In at least one example, the object search mechanism 238 can enable the first user to search one or more communication objects associated with the user profile (e.g., communication objects associated with the user) to identify a particular communication object of interest to the requesting user 214. In some examples, the object search mechanism 238 can enable a search of the communication object(s) by keyword, by number, by identifier, or the like. For example, the requesting user 214 may recall having a conversation with the other user regarding a particular document that is relevant to a collaborative project between the two users. However, the requesting user 214 may not recall the exact communication object in which the conversation took place. In lieu of searching through a plurality of communication objects with which the requesting user 214 and the other user are associated, the requesting user 214 can access the user profile of the other user and input keywords associated with the particular document in the object search mechanism 238. The communication platform can search communication objects associated with the other user and can identify one or more communication objects in which the particular document is discussed. The communication platform can cause the identified communication object(s) to be presented via the user profile interface 156, thereby expediting the identification of relevant information.

In at least one example, the user profile interface 156 can include application data 226 associated with one or more relevant applications. The applications can include first-party applications that are associated with an organization of the user associated with the user profile and/or third-party applications that are accessible to users of the communication platform. In the illustrative example, application data 226 associated with a single scheduling application, is presented via the user profile interface 156. In other examples, application data 226 associated with two or more applications can be presented via the user profile interface 156. In some examples, the communication platform can identify the application(s) to present based on a user preference associated with the user corresponding to the user profile, a user preference associated with the requesting user, an organizational preference associated with an organization of the user, or the like. For example, the user can input a user preference to enable scheduling appointments via a third-party application within the user profile interface 156. The user can provide the communication platform with credentialing information (e.g., login information, key(s), token(s), etc.) to enable access to third-party data associated with the third-party application. The communication platform can utilize the credentialing information to access third-party data stored in association with a third-party service provider.

In some examples, the communication platform can identify the application(s) to present based on interaction data and/or a level of importance of the application data 226. For example, the application(s) can be identified based on frequency of interaction, recency of interaction, designated importance (e.g., flagged as urgent, important, etc.), or the like. In some examples, the communication platform can rank the application(s) based on interactions of the second user therewith, and can present application data 226 associated with top ranked application(s) via the user profile interface 156.

In some examples, the communication platform can identify the application(s) based on a type of service provided by the application, such as a scheduling application, a work-related application, an organizational application (e.g., first party application), and the like. In such examples, the communication platform can cause one or more indicators associated with the applications based on the type of service provided thereby. For example, the communication platform can identify the scheduling application associated with a user account corresponding to the user associated with the user profile, such as an association between the user account of the communication platform and a third-party account associated with the user. The communication platform can cause application data 226 associated with the scheduling application to be presented via the user profile interface 156, such as to enable the requesting user 214 to schedule a meeting with the other user via the scheduling application without leaving a user profile interface 156 of the communication platform.

Figure 2C:
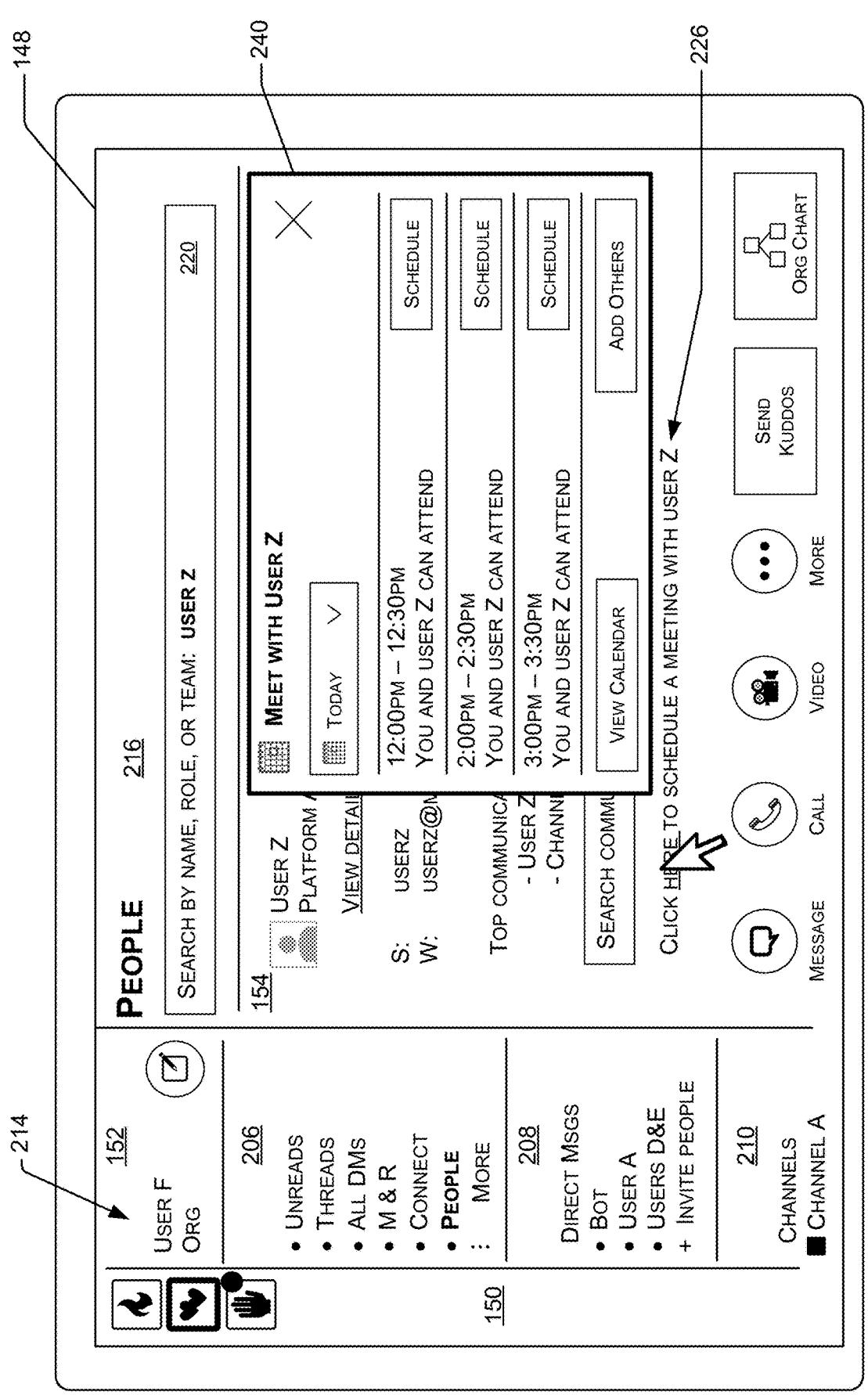
FIG. 2C illustrates the user interface of FIG. 2A in which an application associated with the enhanced user profile is selected, and application data associated therewith is presented.

In various examples, the application data 226 can include one or more links to access associated applications and/or additional application data associated therewith. For example, an indicator associated with a scheduling application can include a link to schedule a meeting via the application (illustrated as "here" in the "Click here to schedule a meeting with User Z"). FIG. 2C illustrates the user interface 148 of FIG. 2A in which a link associated with the application data presented via an enhanced user profile is selected, and data associated therewith is presented via the user interface 148.

In the illustrative example of FIG. 2C, in response to receiving an indication of selection of the application data 226, or a link associated therewith, the communication platform causes a presentation of an application data window 240 in association with the user interface 148. In such an example, the application data window 240 can include data associated with the application. In various examples, the communication platform may utilize an API or other interface to access data associated with the application, such as or presentation via the application data window 240.

In the illustrative example, the application data window 240 includes scheduling data associated with a scheduling application, though this is not intended to be so limiting and the application data window 240 can include alternative data associated with other applications. For example, the application data 226 can include data associated with a service ticket generation application, such as a pending service ticket generated by the user associated with the user profile. Responsive to receiving an indication of selection of a link associated with the service ticket generation application, the communication platform may present service ticket data in the application data window 240. The service ticket data may include details associated with the service ticket, such as a date/time associated with service ticket generation, a status, assets associated with the service ticket, a reason for requesting the service ticket, and the like. For another example, the application data 226 can include data associated with a customer relationship management application, such as a list of customer accounts that are managed by the user. Responsive to receiving an indication of selection of a link customer relationship management application, the communication platform may present customer relationship management data in the application data window 240. The customer relationship management data may include details associated with the one or more customer accounts managed by the user, revenue produced by a customer account, current sales and/or transactions pending, contact information associated with the customer, and the like As illustrated in FIG. 2C, the application data window 240 associated with the scheduling application can include selectable options to enable the requesting user 214 to schedule an appointment with the user. In various examples, the communication platform can be configured to identify one or more open times for scheduling a meeting. In such examples, the communication platform can be configured to access scheduling data associated with the requesting user and the other user (e.g., User Z), to identify the open time(s), such as by communicating with the third-party scheduling application utilizing an API or other interface. In some examples, the communication platform can determine scheduling data associated with the requesting user 214 by accessing third-party user data associated with a third-party scheduling application utilized by the requesting user 214. The third-party scheduling application associated with the requesting user 214 can be the same or different from the third-party scheduling application associated with the other user. In various examples, the communication platform can access credentialing information associated with the requesting user 214, such as that stored in the datastore 126, to enable access to the third-party user data (e.g., scheduling data associated with the requesting user 214).

In various examples, responsive to receiving an indication of selection of a selectable option associated with an open time, the communication platform can send scheduling information to the third-party service provider 108, such as to schedule the meeting between the two users at the open time. In some examples, the application data window 240 may include an additional option to add other users to the meeting. In such examples, the requesting user 214 may schedule a meeting with two or more users via the application data window 240, without leaving the user profile interface 156.

In various examples, in response to receiving a request to schedule the meeting associated with the open time (e.g., receiving an indication of selection of the "schedule" selectable option associated with an open time), the communication platform may cause a presentation of a meeting confirmation message to be presented via the application data window 240. In some examples, the meeting confirmation message may include an ephemeral message that is presented for a short period of time. In various examples, after scheduling the meeting and/or receiving an indication to close the application data window 240, the communication platform may close the application data window 240, returning to the user profile interface 156 view presented in FIG. 2A.

As discussed above, the user profile interface 156 can include inferred characteristics 228 associated with the user corresponding to the user profile. The inferred characteristics 228 can include a work-related expertise (e.g., skill, proficiency, etc.), personal interests (e.g., hobbies, events, processes of interest, etc.), and the like. In various examples, the communication platform can process communications transmitted via the communication platform between the user and one or more other users, to determine context data associated therewith. The context data can include content, circumstances associated with the communications, other users associated with the communications, and the like. Based on the context data associated with one or more communications (e.g., a message, a conversation, etc.), the communication platform can infer characteristics of the user. For example, the communication platform can determine that many different users ask the user for advice about developing and improving applications. The communication platform can determine, based on the inquiries sent to the user, that the user has an inferred expertise in application development. For another example, the communication platform can determine that the user often communicates in Spanish, but that English is listed as a primary language in user data associated with the user. The communication platform can determine that the user has an inferred proficiency in Spanish. For yet another example, the communication platform can determine that the user often discusses or shares information about bicycles and cycling. Based on the communications about the topic of cycling, the communication platform can determine an inferred interest of the user in cycling, and may cause the inferred interest to be presented via the user profile interface 156.

In various examples, the user profile interface 156 can include one or more contact options 242, to enable the requesting user 214 to efficiently contact the user associated with the profile. In some examples, the contact options 242 may be presented via the user profile interface 156 based on user preferences associated with the user and/or an organization of the user. In some examples, the contact options 242 may include a message, calling, video conference, audio conference, or other mode of communication that are presented in affordances in the user profile for quick access. For example, based on a determination that the user preference and/or organizational preference is to not enable the contact options 242, the communication platform may withhold the contact options 242 from view. Alternatively, in some examples, the user profile interface 156 can include a contact option 242 to request permission to contact the user. In some examples, the request may be submitted to an executive assistant of the user, a manager of the user, an administrator associated with the user (e.g., administrative account), or the like. In such examples, the communication platform can limit a number of messages sent directly to a particular user.

In some examples, the user profile interface 156 can include a praise selectable option 244. The praise selectable option 244 can enable the requesting user 214 to quickly and efficiently send a message of praise for an accomplishment, such as work completed, goals achieved, or the like. In various examples, in response to receiving an indication of selection of the praise selectable option 244, the communication platform can automatically send the message of praise, such as a default message. In some examples, in response to receiving the indication of selection of the praise selectable option 244, the communication platform can cause a window or other interface to be presented in association with the user profile interface 156, such as to enable the requesting user 214 to personalize the message of praise. In various examples, the message of praise can be transmitted to the user corresponding to the user profile presented via the user profile interface 156 and/or a manager or other user associated with the user (e.g., teammate, friend, etc.).

In various examples, the user profile interface 156 can include an organization chart selectable option 246. The organization chart selectable option 246 can enable the requesting user 214 to view an organizational chart associated with the user of the user profile. In some examples, the organizational chart can be linked to the user profile, such that, responsive to a selection of the organization chart selectable option 246, the communication platform can cause a visual depiction of members and relationships of an organization of a user with respect to the user. For example, responsive to receiving an indication of selection of the organization chart selectable option 246, the communication platform can cause an illustration of one or more peer relationships, managerial relationships, assistants associated with the user, affiliated teams associated with the user, and the like.

In some examples, the organization chart selectable option 246 can include a link to an extended organizational chart including a visualization of a structure of an organization of the user. For example, the extended organization chart can include a visual depiction of the employees of the organization and their respective working relationships, including team affiliations. In various examples, the extended organizational chart and/or the organizational chart described above may include a visual depiction of actual communications between two or more users. In such examples, the communication platform may determine an actual amount, frequency, and/or importance (e.g., determined value based on context data) of communications between users. The communication platform may thus cause a presentation of actual communications in association with the organizational chart and/or the extended organizational chart.

In various examples, the communication platform can be configured to determine the organizational chart and/or the extended organizational chart and associated data. In such examples, the data associated with the organizational chart and/or the extended organizational chart may be stored in association with communication platform user data 128 and/or as organizational data stored in association with the datastore 126. In some examples, the organizational chart and/or the extended organizational chart and associated data may be provided to the communication platform by a third-party service provider 108, such as for presentation via a user profile interface 126 or organization page, such as that described below with respect to FIG. 3.

Figure 3:
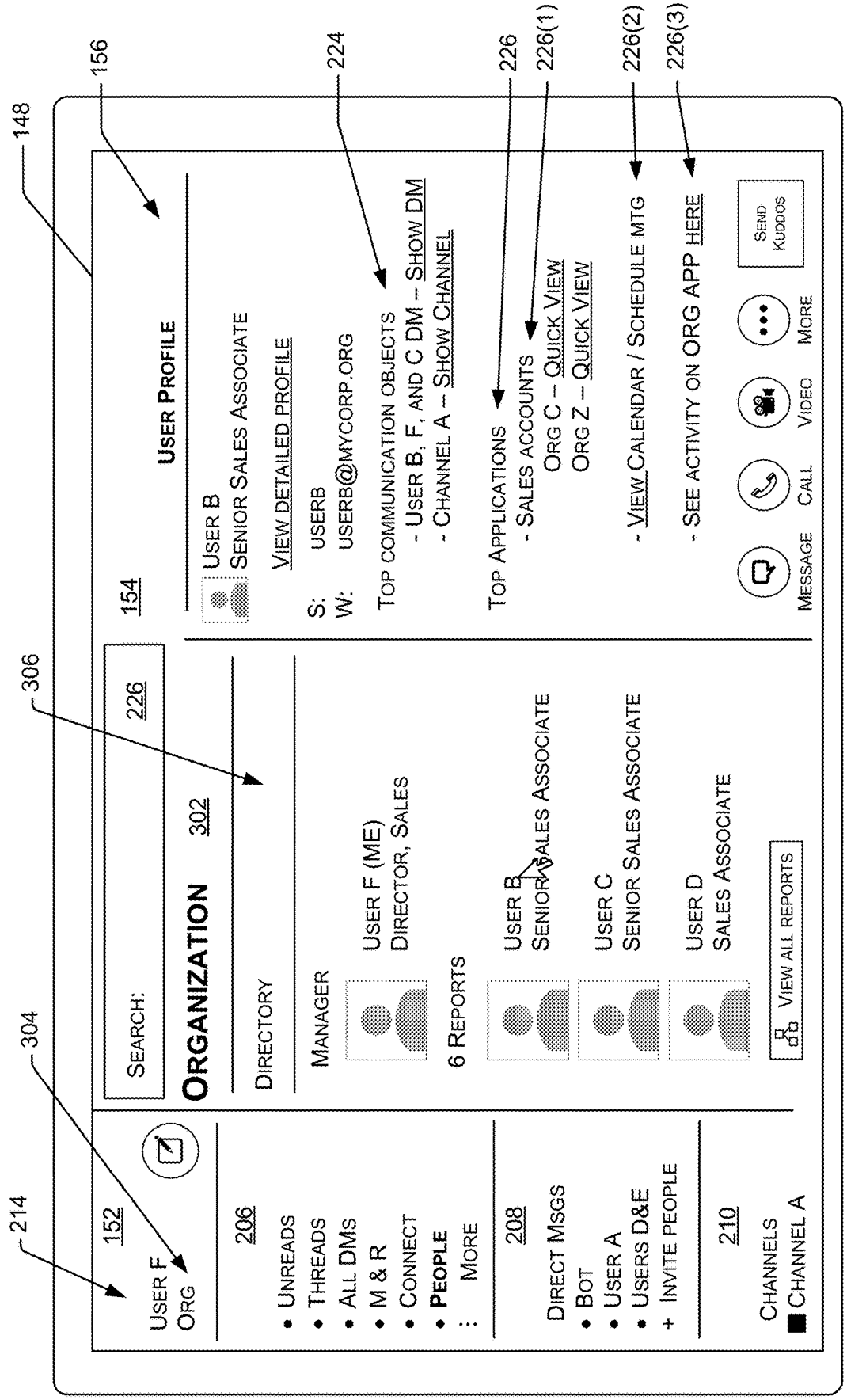
FIG. 3 illustrates an example user interface for enabling access to an enhanced user profile of another user via an organizational directory, as described herein.

FIG. 3 illustrates an example user interface 148 for enabling access to a user profile interface 156 via an organization page 302. In various examples, the user interface 148 can include an organization page selectable option 304, such as to enable a requesting user 214 to view the organization page 302. The organization page 302 can include a page including data associated with an organization of the user. In some examples, the organization page 302 can include organization data, such as a name of the organization, one or more locations associated with the organization, leadership of the organization, or the like. In at least one example, the organization page 302 can include user data associated with users of the organization, such as employee data associated with employees of the organization. In such an example, the organization page 302 can include a directory of users associated with the organization.

In some examples, in response to receiving an indication of selection of the organization page selectable option 304, the communication platform may cause an organizational chart associated with the requesting user to be presented in the third region 154. The organizational chart may include a representation of a hierarchical structure associated with the organization, such as that depicting relationships between users in a work-related context (e.g., peer relationships, managers, assistants, affiliated teams, etc.). For example, the organizational chart can illustrate a relationship between a manager of a team and reporting members of the team. In the illustrative the organizational page 302 includes a directory 306 illustrating a manager and reporting members listed in alphabetical order. In other examples, the reporting members may be listed in hierarchical order, such as based on sub-teams or the like.

In various examples, in response to receiving an indication of selection of a user (e.g., User B), the communication platform can cause a user profile interface 156 to be presented via the third region 154. In the illustrative example, the organization page 302 and the user profile interface 156 are both included in the third region 154, such as in a bifurcated view. In other examples, responsive to receiving the indication of selection of the user, the communication platform may cause the user profile interface 156 to be presented across the third region 154, such as in lieu of or without concurrently presenting the organization page 302.

In various examples, in response to receiving an indication of selection of the user, the communication platform can determine data to present in association with the user profile interface 156. In the illustrative example, the data includes user data 222, communication objects 224, and application data 226. In various examples, the communication platform can determine the communication objects 224 and/or the application data 226 based on permissions associated with the requesting user 214. In some examples, the permissions can include permissions to view particular communication objects and/or other permissions associated with the communication platform. For example, the communication platform can determine that the requesting user has permissions to view the direct messaging instance (e.g., multi-person direct messaging instance between User B, F, and C) and the channel (e.g., Channel A). In some examples, the permissions to view a channel can be based on a membership with the channel and/or an ability to join the channel, such as that based on privacy settings of the channel, organizational affiliation of the requesting user 214, or the like.

In some examples, the permissions to view application data 226 can include permissions associated with a position or title of the requesting user 214. In such examples, the communication platform can determine to present particular application data 226 associated with the user based on the position or title of the requesting user 214. For example, the requesting user 214 in the illustrative example (e.g., User F), is the manager of the selected user (e.g., User B). Based on a determination that the requesting user 214 is a manager of the selected user, the communication platform can cause first application data 226(1) to be presented, the first application data 226(1) including customer relationship management information associated with a customer relationship management application corresponding to sales accounts.

Additionally, or in the alternative, the permission to view specific details associated with the application data 226 can be determined based on the position and/or title of the requesting user 214 (e.g., a relationship between the requesting user 214 and the user associated with the user profile). For example, the communication platform can determine that the customer relationship management application is a top ranked application associated with the user, such as based on frequency of interaction, recency of interaction, level of importance, and/or other factors described above with respect to ranking applications. Accordingly, the communication platform can provide an indication of the first application data 226(1) associated with the customer relationship management application in association with the user profile interface 156. However, based on a determination that the requesting user 214 is a manager of the user, the communication platform can present additional information associated with the customer relationship management application, such as particular sales accounts the user is associated with. Additionally, in some examples, based on a determination that the requesting user 214 has permission to view details associated with the particular sales accounts, such as based on a relationship with the user or other permissions, the communication platform can cause a presentation of selectable options to view details associated with the sales accounts. Though this is merely an illustrative example, and other applications and data associated therewith are contemplated herein. For example, based on a determined relationship between the requesting user 214 and the user associated with the user profile, the communication platform can cause details associated with service tickets to be presented. For another example, based on a determined relationship between the requesting user 214 and the user associated with the user profile, such as a teammate relationship, the communication platform can cause additional details associated with collaborative tool applications to be presented or accessible via the user profile interface 156.

In various examples, the communication platform can determine to present application data 226 associated with two or more applications in association with the user profile interface 156. The application data 226 can be associated with third-party applications, such as those managed by a third-party service provider 108 and/or first-party applications, such as those managed by the organization of the user. For example, second application data 226(2) can be associated with a third-party scheduling application and third application data 226(3) can be associated with a first-party organizational application. As discussed above, the application data 226 can include selectable options or links to view data associated with the respective applications. For example, responsive to receiving an indication of selection of the second application data 226(2) or a selectable option, link, or the like associated therewith, an application data window, such as application data window 240 may be presented via the user interface 148, such as that described above with respect to FIG. 2C.

Figure 4:
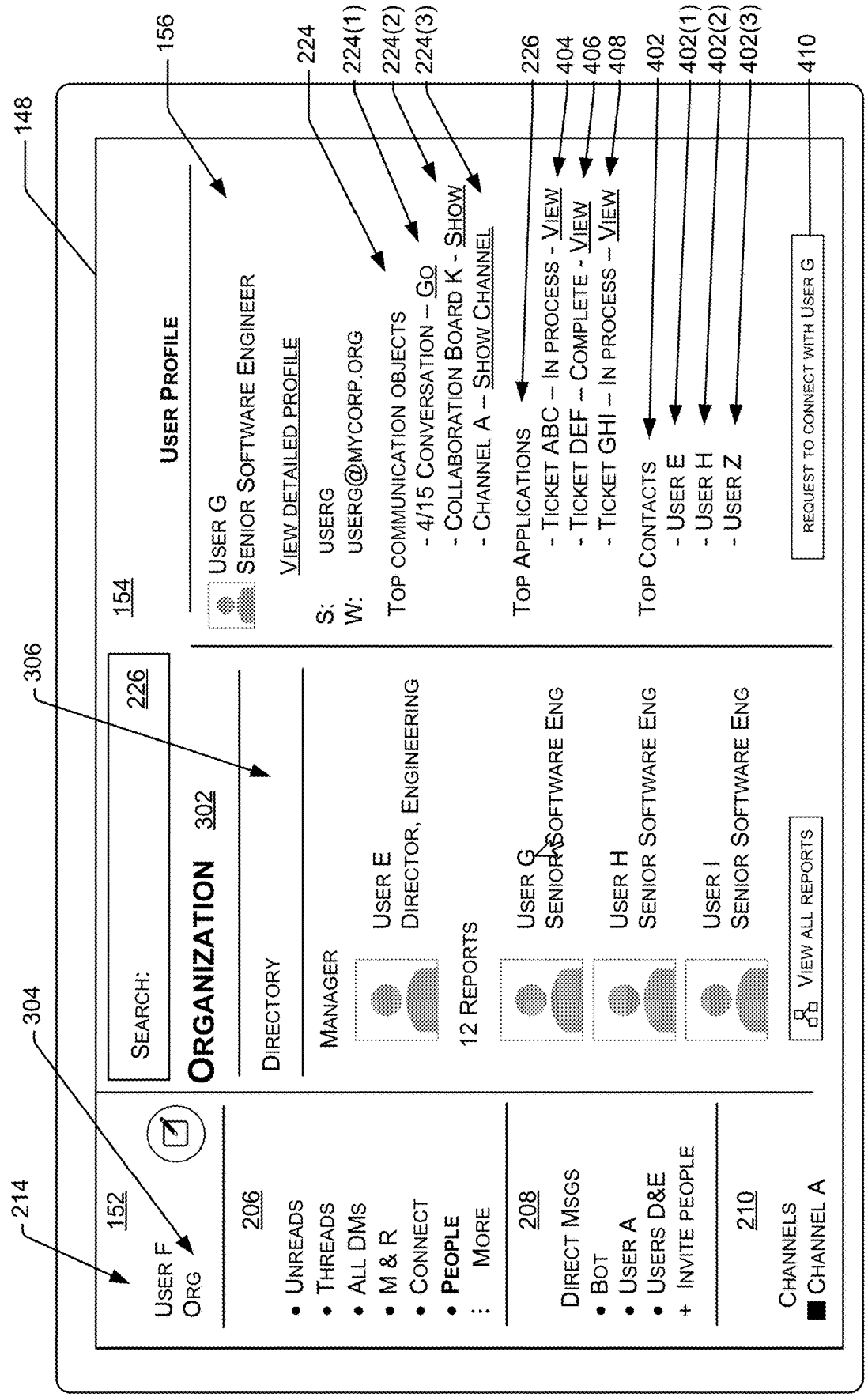
FIG. 4 illustrates another example user interface for enabling access to an enhanced user profile of another user via an organizational directory, as described herein.

FIG. 4 illustrates an example user interface 148 for enabling access to another user profile interface 156 via an organization page 302. As illustrated in FIG. 4, the requesting user 214 (e.g., User F) accesses the organization page 302, such as to search for another user of an organization via an organization directory 306. In the example illustrated in FIG. 3, the requesting user 214 viewed indicators associated with other users of a team with which the requesting user 214 is associated (e.g., the requesting user 214 was a manager of the team illustrated in the organization page 302 of FIG. 3). In the illustrative example of FIG. 4, the requesting user 214 views a team of users (e.g., manager and reports) that that is different from the team associated with the requesting user 214, and selects a particular user (e.g., User G) for viewing a user profile associated therewith. Based in part on a determination that the requesting user 214 is not associated with the team corresponding to the selected user (User G), the communication platform may determine permissions associated with the requesting user 214.

In various examples, in response to receiving the indication of selection of the particular user (User G), the communication platform can determine data to present in association with the user profile interface 156 associated with the selected user. In the illustrative example, the user profile interface 156 includes communication objects 224, application data 226, and additional contacts 402 associated with the user. As discussed above, the communication objects 224, application data 226, and additional contacts 402 may each include data with which the requesting user 214 has permission to view.

In various examples, the communication platform can identify the communication objects 224 based on relevance to the user associated with the user profile and/or relevance to the requesting user. The relevance can include the recency of access, recency of contribution, frequency of contribution, frequency of access, frequency of cross mentions (e.g., requesting user 214 mentions the other user, other user mentions the requesting user 214, etc.), and the like. The recency and/or frequency of interaction with the communication object can be interaction of the user associated with the communication object and/or interaction of the requesting user 214 with the communication object. In at least one example, the communication platform can cause a presentation of a number of the top ranked communication object(s) via a user profile interface. For example, the communication platform may present three (3) top ranked communication objects 224, such as the first communication object 224(1) including a conversation (e.g., via an audio or video communication interface) that took place on April 15, a second communication object 224(2) including a collaboration board, and a third communication object 224(3) including a communication channel.

In at least one example, the communication platform can identify one or more applications that are associated with the user corresponding to the user profile for presentation via the user profile interface 156, such as via application data 226. The applications can include first-party applications that are associated with an organization of the second user and/or third-party applications that are accessible to users of the communication platform. In various examples, the communication platform can identify the application(s) based on frequency of interaction, recency of interaction, designated importance (e.g., flagged as urgent, important, etc.), or the like. In some examples, the communication platform can rank the application(s) based on interactions of the user therewith, and can present one or more indicators associated with top ranked application(s) via the user profile interface.

In some examples, the communication platform can identify the application data 226 to be presented based on a type of service provided by the associated application and/or a position or title associated with the selected user. For example, the selected user may be a software engineer and may often generate service tickets associated with software programs. Based on the frequency of engagement with a third-party service ticket generation application, the communication platform can determine to cause a presentation of the service ticket generation application in association with the user profile interface 156. In the illustrative example, the application data 226 includes data associated with service tickets that are associated with the selected user. For example, the application data 226 includes first service ticket data 404 associated with a first service ticket, second service ticket data 406 associated with a second service ticket, and third service ticket data 408 associated with a third service ticket.

In various examples, the communication platform can utilize an API or other interface to determine a status associated with each of the service tickets associated with the selected user. For example, the communication platform communicates with the third-party service ticket generation application to determine first service ticket data 404 to indicate that the first service ticket is in process, second service ticket data 406 to indicate that the second service ticket is completed, and third service ticket data 408 to indicate that the third service ticket is in process. In some examples, the communication platform may include a selectable option with one or more of the first service ticket data 404, the second service ticket data 406, and/or the third service ticket data 408, such as to enable the requesting user 214 to view additional details associated with respective service tickets.

In various examples, the communication platform can be configured to identify one or more additional contacts 402 associated with the selected user. The additional contact(s) 402 can include other users with whom the selected user frequently communicates, often communicates, has a relationship with (e.g., personal relationship, professional relationship (e.g., manager/subordinate, teammate, etc.), or the like. For example, a first additional contact 402(1) can be identified based on a first professional relationship with the selected user (e.g., manager of the selected user). For another example, a second additional contact 402(2) can be identified based on a second professional relationship with the second selected user (e.g., teammate of the selected user). For yet another example, the third additional contact 402(3) can be identified based on a determination that a frequency of communication between the third additional contact 402(3) and the selected user meets or exceeds a threshold amount of communication (e.g., daily communication, every other hour, etc.).

In some examples, the user profile interface 156 can include one or more contact options, such as contact option(s) 242. In such examples, the contact option(s) can enable the requesting user 214 to directly contact the selected user associated with the user profile. In some examples, the user profile interface 156 can include a connection request option 410, via which the requesting user 214 can request to communicate with the selected user. In some examples, in response to receiving an indication of selection of the connection request option 410, the communication platform may send a message to an executive assistant of the selected user, a manager of the selected user, an administrator associated with the selected user (e.g., administrative account), or the like, requesting authorization for the requesting user 214 to communicate directly with the selected user. In such examples, the communication platform can limit a number of messages sent directly to a particular user. In some examples, the communication platform may send the request directly to the selected user, such as to enable the selected user to accept or decline the request to communicate directly with the requesting user 214.

FIGS. 5-12 are flowcharts showing example processes involving techniques as described herein. The processes illustrated in FIGS. 5-12 are described with reference to components described above with reference to the system 100 shown in FIG. 1 for convenience and ease of understanding. However, the processes illustrated in FIGS. 5-12 are not limited to being performed using the components described above with reference to the system 100. Moreover, the components described above with reference to the system 100 are not limited to performing the processes illustrated in FIGS. 5-12.

FIG. 5 illustrates an example process 500 for causing a display of an enhanced user profile of a user, as described herein.

At operation 502, a server 102 receives, from a client associated with a first user account of a communication platform, a request to view a user profile associated with a second user account of a second user of the communication platform. In various examples, the request to view the user profile can be received via a directory interface, such as directory interface 218 and/or an organization page, such as organization page 302. In some examples, the request can be received based on an indication of selection of an indicator associated with the second user, such as in a directory (e.g., directory 306). In some examples, the request to view the user profile can be submitted via a search mechanism, such as search mechanism 220. In such examples, the request can include a submission of a name, contact information, or other identifier associated with the second user.

At operation 504, the server 102 identifies, based on the request and interaction data associated with one of the first user account or the second user account, an object associated with the communication platform. The object can include a communication object, such as a communication channel, direct messaging instance, message, thread, board, audio and/or video communication interface, and/or the like. The interaction data can include data associated with one or more interactions of the first user account and/or the second user account with the communication platform. In various examples, the server 102 identifies the object based on a determination that a number of interactions of the first user account and/or the second user account with the object is above a threshold number. In some examples, the server 102 identifies the object based on a determination that a frequency of interactions of the first user account and/or the second user account with the object is above a threshold frequency. In some examples, the server 102 identifies the object based on a determination that a recency of interaction of the first user account and/or the second user account with the object is within a threshold time period. In various examples, the server 102 identifies the object based on a determination that the object is marked as a favorite object or is otherwise designated as an important object to the second user.

At operation 506, the server 102 causes display of a user profile interface via the client, the user profile interface including user data associated with the user profile of the second user and an indicator associated with the object. The user data associated with the second user can include a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. The indicator associated with the object can include a name of the object, a location of the object, a type of object, and/or other identifying information associated with the object. In some examples, the indicator may include a selectable option to launch the object, such as that described above with regard to FIG. 2B.

Additionally, or in the alternative, the user profile interface may include one or more applications associated with the first user account and/or the second user account, one or more additional contacts of the second user, and/or inferred characteristics of the second user, such as that described above. In at least one example, the server 102 determines the amount and type of data to present in association with the user interface profile based on permissions of the first user to view and/or access said data.

Figure 6:
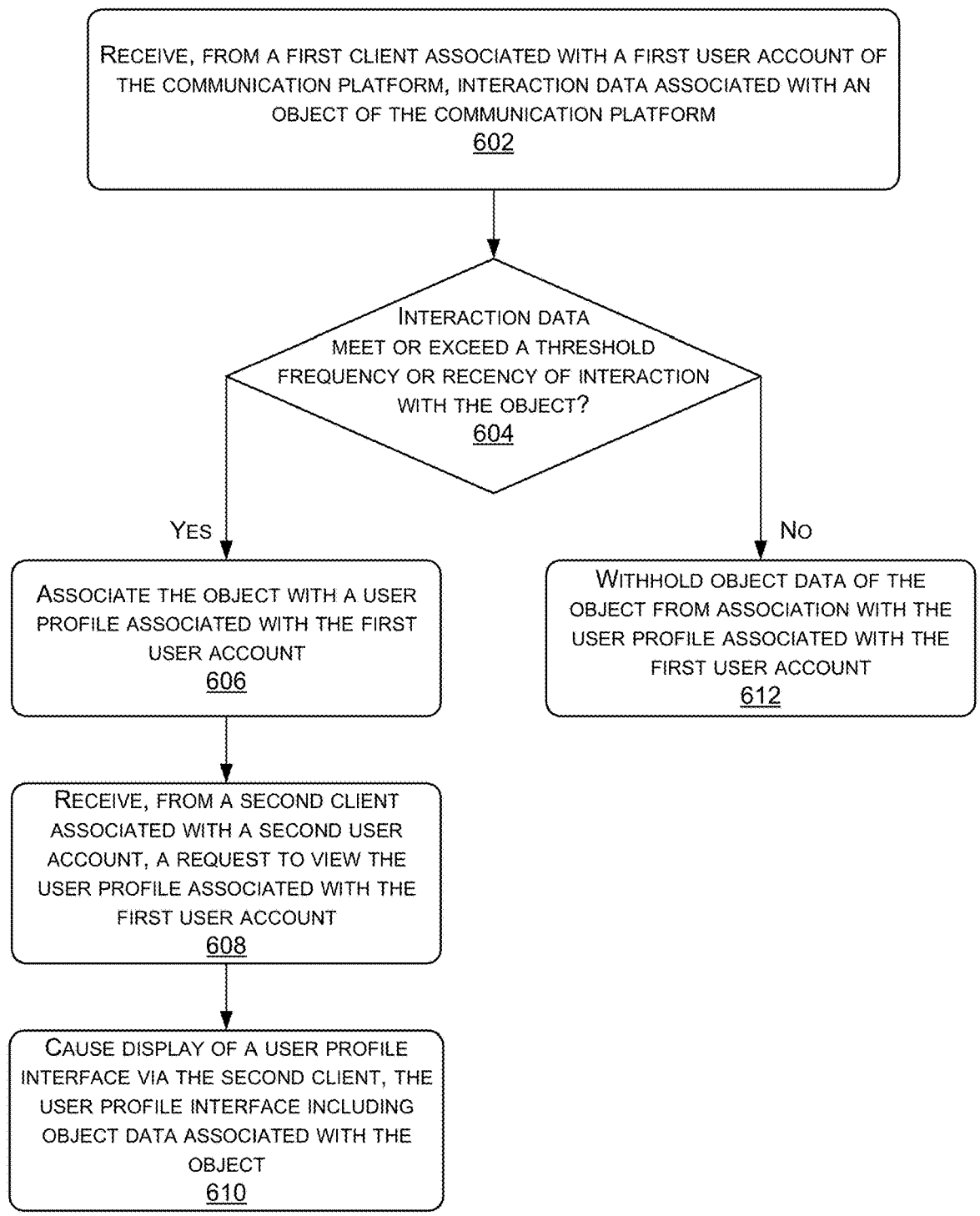
FIG. 6 illustrates an example process for determining whether to associate an object with an enhanced user profile of a user based on interactions of the user, as described herein.

FIG. 6 illustrates an example process 600 for determining whether to associate an object with an enhanced user profile of a user based on interactions of the user therewith, as described herein.

At operation 602, a server 102 receives, from a first client associated with a first user account of the communication platform, interaction data associated with an object of the communication platform. The interaction data can include data associated with one or more interactions of the first user account with the communication platform. The interaction(s) can include accessing the object, transmitting messages via the object, reacting to messages posted via the object, interacting with applications in association with the object (e.g., first-party applications, third-party applications, etc.), mentioning other users in association with the object, inviting other users to join the object, and the like. In various examples, the interaction data can include a frequency of interaction with the object, a recency of interaction with the object, a designation of the object as a favorite or preferred object, or the like.

At operation 604, the server 102 determines whether the interaction data meets or exceeds a threshold recency or frequency of interaction with the object. The threshold recency or frequency of interaction can include thresholds associated with common and/or continuous interaction with the object, such as on a daily basis, multiple times daily, or the like. In some examples, the thresholds can be determined based on a type of object associated with the object. For example, a threshold frequency of interaction associated with a direct messaging interface may be one interaction per day, whereas a threshold frequency of interaction associated with a communication channel may be six interactions per day.

In some examples, the recency and/or frequency thresholds associated with each user of an organization and/or across organizations may be the same. In some examples, the recency and/or frequency threshold may be different for each user. In some examples, the threshold(s) may be determined based on an amount of time that a user has been associated with the communication platform, a number of object(s) the user is associated with, and the like. For example, a user that is associated with 100 objects may have a first recency and/or first frequency threshold, and a user that is associated with 1000 objects may have a second recency and/or second frequency threshold.

Based on a determination that the interaction data meets or exceeds the threshold recency or frequency of interaction ("Yes" at operation 604), the server 102, at operation 606, associates the object with a user profile associated with the first user account. In various examples, the server 102 stores an indication of the object in association with the user profile.

At operation 608, the server 102 receives, from a second client associated with a second user account of the communication platform, a request to view the user profile associated with the first user account. As discussed above, the request to view the user profile can be received via a directory interface, such as directory interface 218 and/or an organization page, such as organization page 302. In some examples, the request can be received based on an indication of selection of an indicator associated with the first user, such as in a directory (e.g., directory 306). In some examples, the request to view the user profile can be submitted via a search mechanism, such as search mechanism 220. In such examples, the request can include a submission of a name, contact information, or other identifier associated with the first user.

At operation 610, the server 102 causes display of a user profile interface via the second client, the user profile interface including object data associated with the object. The object data can include a name of the object, a location of the object, a type of object, and/or other identifying information associated with the object. In some examples, the object data can include a selectable option to launch the object, such as that described above with regard to FIG. 2B. Additionally, the user profile interface can include user data associated with the first user, such as a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. As described above, the user profile interface can additionally or alternatively include one or more applications associated with the first user, one or more additional contacts of the first user, and/or inferred characteristics of the first user. In at least one example, the server 102 determines the amount and type of data to present in association with the user interface profile based on permissions of the second user to view and/or access said data.

Based on a determination that the interaction data does not meet the threshold recency or frequency of interaction ("No" at operation 604), the server 102, at operation 612 withholds object data from association with the user profile associated with the first user account. In some examples, the server 102 can cause display of one or more applications, additional contacts, and/or inferred characteristics in lieu of the object data.

Figure 7:
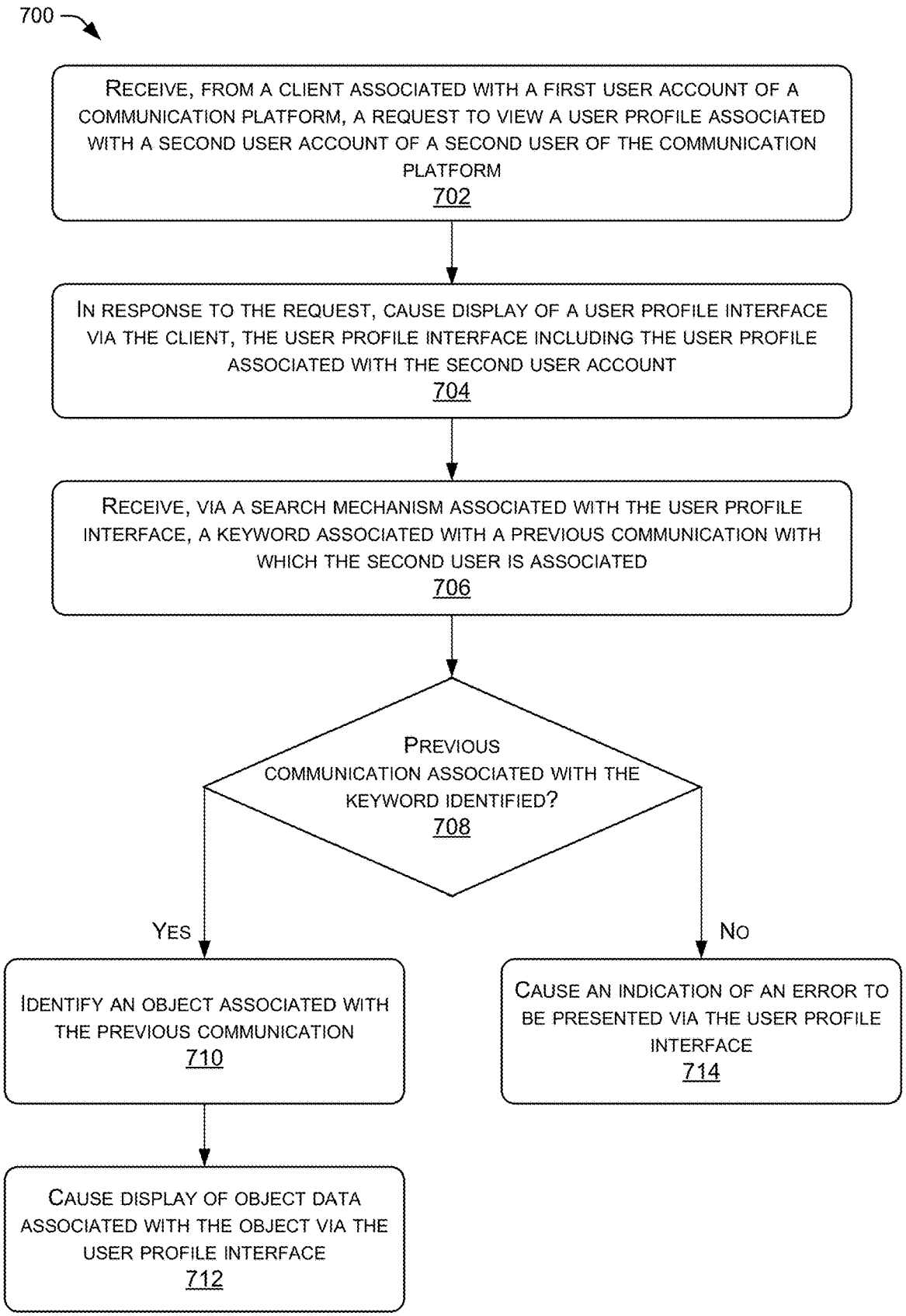
FIG. 7 illustrates an example process for enabling a search for a communication object via an enhanced user profile, as described herein.

FIG. 7 illustrates an example process 700 for enabling a search for a communication object via an enhanced user profile, as described herein.

At operation 702, the server 102 receives, from a client associated with a first user account of a communication platform, a request to view a user profile associated with a second user account of a second user of the communication platform. In various examples, the request to view the user profile can be submitted via a directory interface, such as directory interface 218 and/or an organization page, such as organization page 302. In some examples, the request can be received based on an indication of selection of an indicator associated with the second user, such as in a directory (e.g., directory 306). In some examples, the request to view the user profile can be submitted via a search mechanism, such as search mechanism 220. In such examples, the request can include a submission of a name, contact information, or other identifier associated with the second user.

At operation 704, the server 102, in response to the request, causes display of a user profile interface via the client, the user profile interface including the user profile associated with the second user account. The user profile can include user data associated with the second user, including, but not limited to, a name (e.g., full name, username, etc.), contact information (e.g., email address, phone number, etc.), location (e.g., time zone, geographical location, home location, office location, etc.), schedule information (e.g., full-time employee, part-time employee, contractor, etc.), title (e.g., work position, etc.), image (e.g., photograph, GIF, etc.), and the like. Additionally, the user profile can include one or more communication objects, applications (third-party applications, first party applications, etc.), additional contacts of the second user (e.g., frequent communicators, collaborators, etc.), and/or inferred characteristics associated with the second user. Non-limiting examples, of the user profile interface are illustrated above with regard to FIGS. 2A-4.

At operation 706, the server 102 receives, via a search mechanism, a keyword associated with a previous communication with which the second user is associated. In some examples, the search mechanism can be associated with the user profile. In some examples, the search mechanism can be a general search mechanism configured to enable a search of content associated with the communication platform. The previous communication can include a message, attachment associated with a message, third-party document accessible via a communication object, or the like. In various examples, the server 102 can receive the keyword input via the search mechanism and can search communications associated with the second user to identify instances of the keyword. In various examples, the server 102 can identify the communications to search based on an association with a user identifier, group identifier, communication object identifier (of which the second user is associated) or the like of the second user. In such examples, the communication may have stored in association therewith, the user identifier, group identifier, communication object identifier, or the like.

At operation 708, the server 102 determines whether the previous communication associated with the keyword is identified. The server 102 analyzes communications that are associated with the second user to determine whether the keyword is identified in association with the previous communication.

Based on a determination that the previous communication is identified ("Yes" at operation 708), the server 102, at operation 710, identifies an object associated with the previous communication. The object can include a communication object, such as a communication channel, direct messaging instance, message, thread, board, audio and/or video communication interface, and/or the like. The server 102 determines the object based on an object identifier associated therewith, such as that stored as metadata associated with the previous communication.

At operation 712, the server 102 causes display of object data associated with the object via the user profile interface. In some examples, the server 102 can cause a presentation of an indicator associated with the object, such as to enable the first user to identify the object. In some examples, the server 102 can cause a selectable option to be presented in association with the object, such as to enable the first user to cause the object to be presented in association with the user profile interface, such as in a bifurcated view. Such a selectable option is illustrated above with respect to FIG. 2B. In some examples, responsive to receiving an indication of selection of the selectable option, the server 102 can cause the object to be presented with a most current message in a messaging feed presented at the bottom of the interface. In some examples, responsive to receiving an indication of selection of the selectable option, the server 102 can cause the object to be presented at a time in the messaging feed associated with the previous communication. In such examples, the server 102 may cause the previous communication associated with the keyword to be presented to the requesting user, to expedite identification and view of the previous communication. Such a presentation may significantly reduce an amount of time associated with searching for a previous communication, conversation, and the like. Accordingly, the techniques described herein may improve the functioning of the computing device and may increase network bandwidth by reducing an amount of data transmitted between the client and the server 102.

Based on a determination that the previous communication is not identified ("No" at operation 708), the server 102, at operation 714, causes an indication of an error to be presented via the user profile interface. The indication of the error may include an indication that no communication (e.g., message, communication object, etc.) associated with the keyword was identified.

Figure 8:
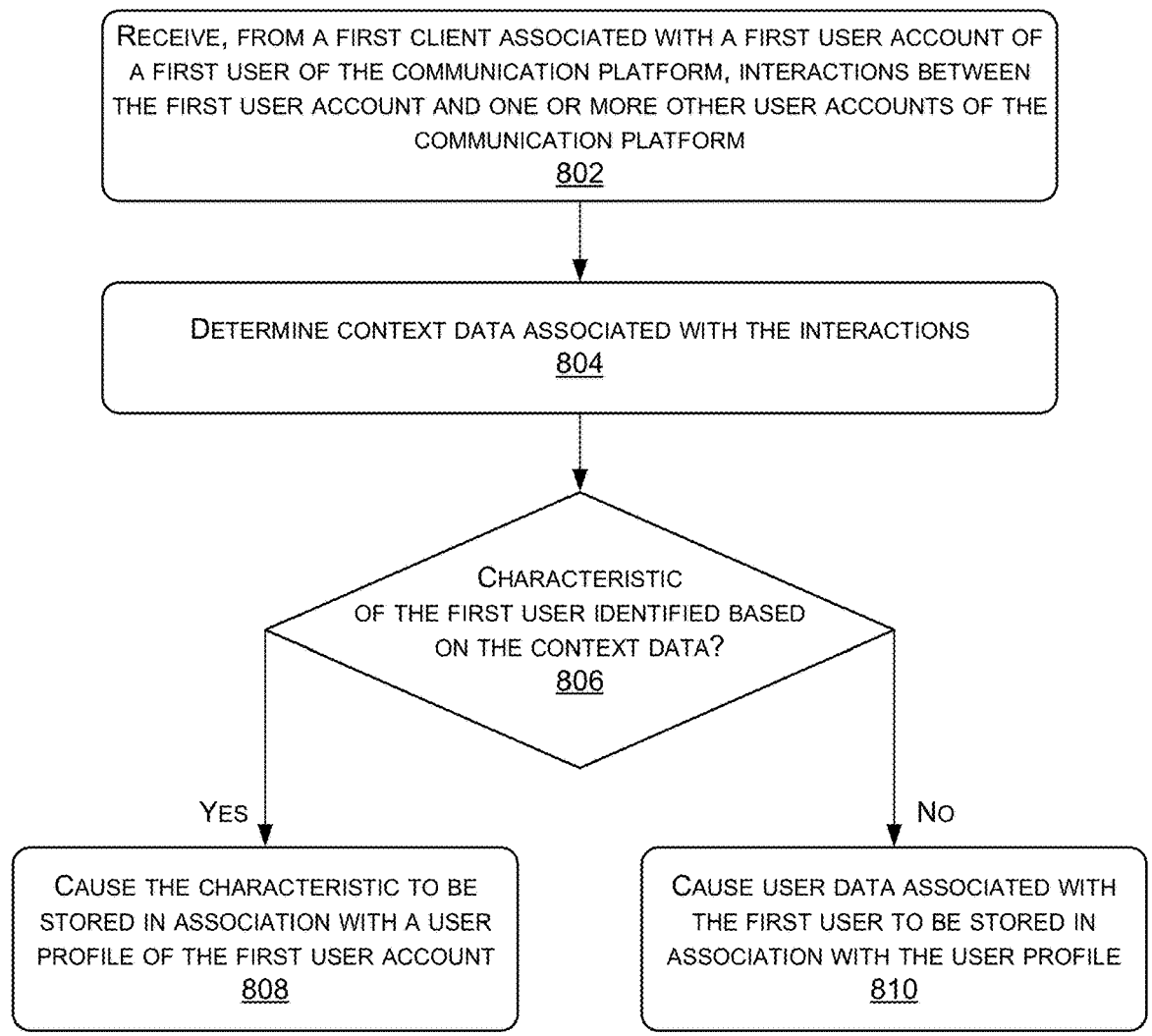
FIG. 8 illustrates an example process for identifying inferred characteristics associated with a user, for presentation in association with an enhanced user profile, as described herein.

FIG. 8 illustrates an example process 800 for identifying inferred characteristics associated with a user, for presentation in association with an enhanced user profile, as described herein At operation 802, the server 102 receives, from a first client associated with a first user account of a first user of the communication platform, interactions between the first user account and one or more other user accounts of the communication platform. The interactions between the first user account and the other user(s) can include transmitting messages to the other user(s), reacting to messages transmitted by the other user(s), interacting with applications associated with the other users (e.g., first-party applications, third-party applications, etc.), mentioning the other user(s) in communications, inviting the other user(s) to join one or more objects, and the like.

At operation 804, the server 102 determines context data associated with the interactions. The context data can include content (e.g., information transmitted in text of the communication, reactions, emojis, attachments, third-party applications associated with the communication, links included in the communications, etc.), circumstances associated with the interactions (e.g., work-related interactions, personal interactions, request for information, request for assistance, sharing information, etc.), identification of one or more other users associated with the communications (e.g., a number and type of user associated with the communications, etc.), object data associated with the communication object via which the interactions occur (e.g., private conversation, public conversation, etc.), and the like.

At operation 806, the server 102 determines whether a characteristic of the first user is identified based on the context data. The characteristic can include a work-related expertise, personal interests (e.g., hobbies, events, processes of interest, etc.), or the like. In various examples, the communication platform can process communications transmitted via the communication platform between the second user and one or more other users, to determine context data associated therewith. In various examples, the server 102 can analyze the interactions to determine one or more trends associated with the interactions. Trends can include similarities between interactions, such as common inquiries of a particular type, common conversations about a particular topic, and the like. In some examples, the trend(s) can be determined based on a number of a particular type of interaction being above a threshold number over a period of time (e.g., 5 interactions of a particular type over a week, 3 interaction of a particular type per day, etc.).

Based on a determination that the characteristic is identified ("Yes" at operation 806), the server 102, at operation 808, causes the characteristic to be stored in association with a user profile of the first user account. In various examples, responsive to receiving a request to view the user profile, the server 102 can cause the characteristic to be presented via the user profile interface.

Based on a determination that the characteristic is not identified ("No" at operation 806), the server 102, at operation 810, causes other user data to be stored in association with the user profile of the first user. As discussed above, the other user data can include a name, contact information, location, schedule information, title, image, one or more communication objects, one or more applications associated with the first user, and/or one or more additional contacts of the first user.

Figure 9:
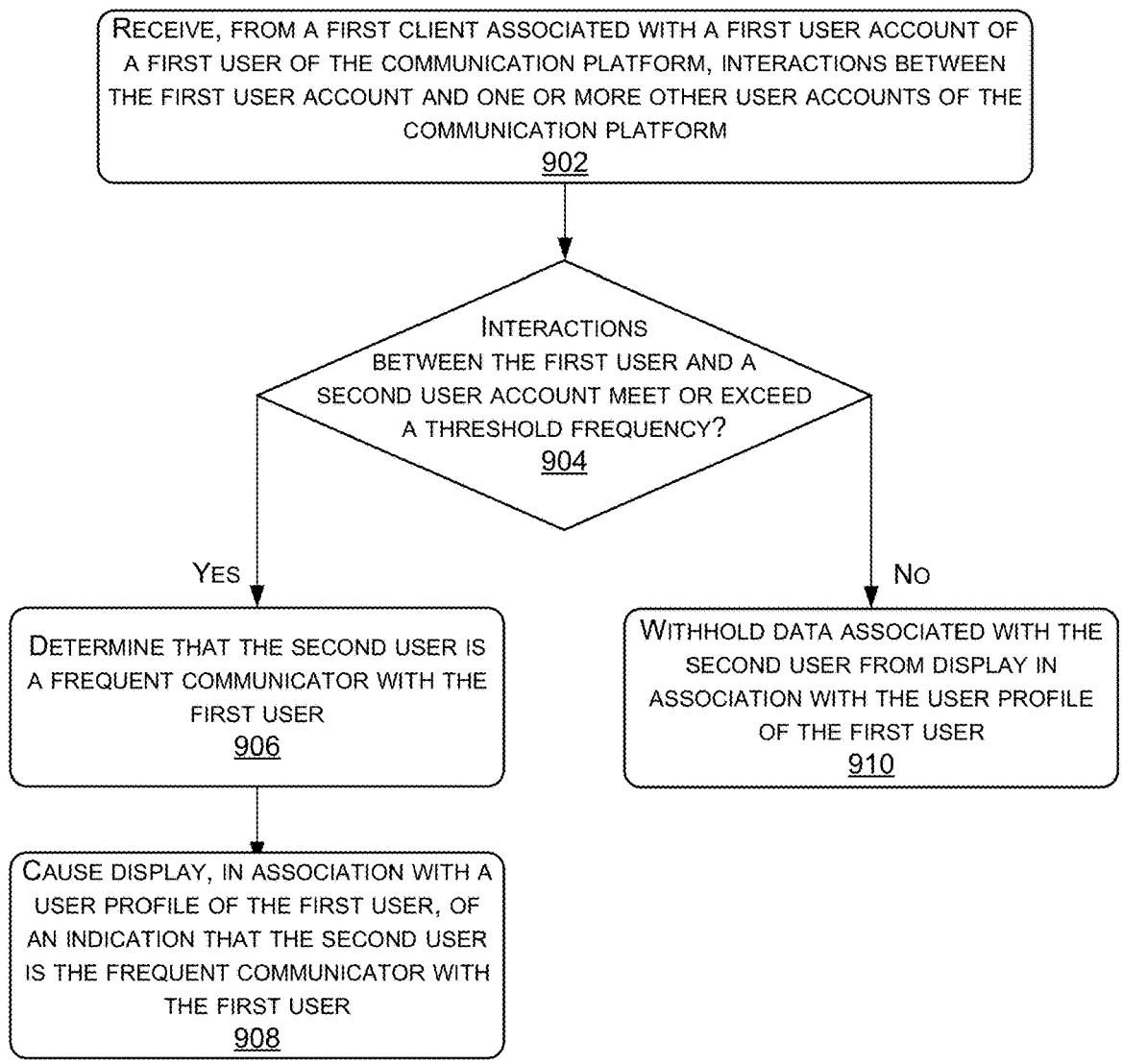
FIG. 9 illustrates an example process for identifying an associated contact of a user, for presentation in association with an enhanced user profile, as described herein.

FIG. 9 illustrates an example process 900 for identifying an associated contact of a user, for presentation in association with an enhanced user profile, as described herein.

At operation 902, the server 102 receives, from a first client associated with a first user account of a first user of the communication platform, interactions between the first user account and one or more other user accounts of the communication platform. The interactions between the first user account and the other user(s) can include transmitting messages to the other user(s), reacting to messages transmitted by the other user(s), interacting with applications associated with the other users (e.g., first-party applications, third-party applications, etc.), mentioning the other user(s) in communications, inviting the other user(s) to join one or more objects, and the like.

At operation 904, the server 102 determines whether interactions between the first user and a second user meet or exceed a threshold frequency of interaction. The threshold frequency of interaction can include a threshold associated with common and/or continuous interaction between the first user and the second user, such as on a daily basis, multiple times daily, or the like. In some examples, the threshold frequency associated with the first user and the second user may be the same. In some examples, the threshold frequency associated with the first user and the second user may be different. In some examples, the threshold frequency may be determined based on an amount of time that a respective user has been associated with the communication platform, a number of contacts associated with the user, and the like. For example, a user that is associated with 100 contacts in the communication platform may have a first frequency threshold, and a user that is associated with 1000 contacts in the communication platform may have a second frequency threshold.

Based on a determination that the interactions between the first user and the second user meet or exceed the threshold frequency ("Yes" at operation 904), the server 102, at operation 906, determines that the second user is a frequent communicator with the first user. In various examples, the server 102 can store an indication that the second user is the frequent communicator of the first user in association with a first user profile of the first user and/or a second user profile of the second user.

At operation 908, the server 102 causes display, in association with a first user profile of the first user, of an indication that the second user is a frequent communicator with the first user. In some examples, the indication can include a link to communicate with the second user, such as to provide a quick and efficient means for connecting to the second user (e.g., the frequent communicator of the first user).

Based on a determination that the interactions between the first user and the second user do not meet the threshold frequency ("No" at operation 904), the server 102, at operation 910 withholds data associated with the second user from display in association with the user profile of the first user.

Figure 10:
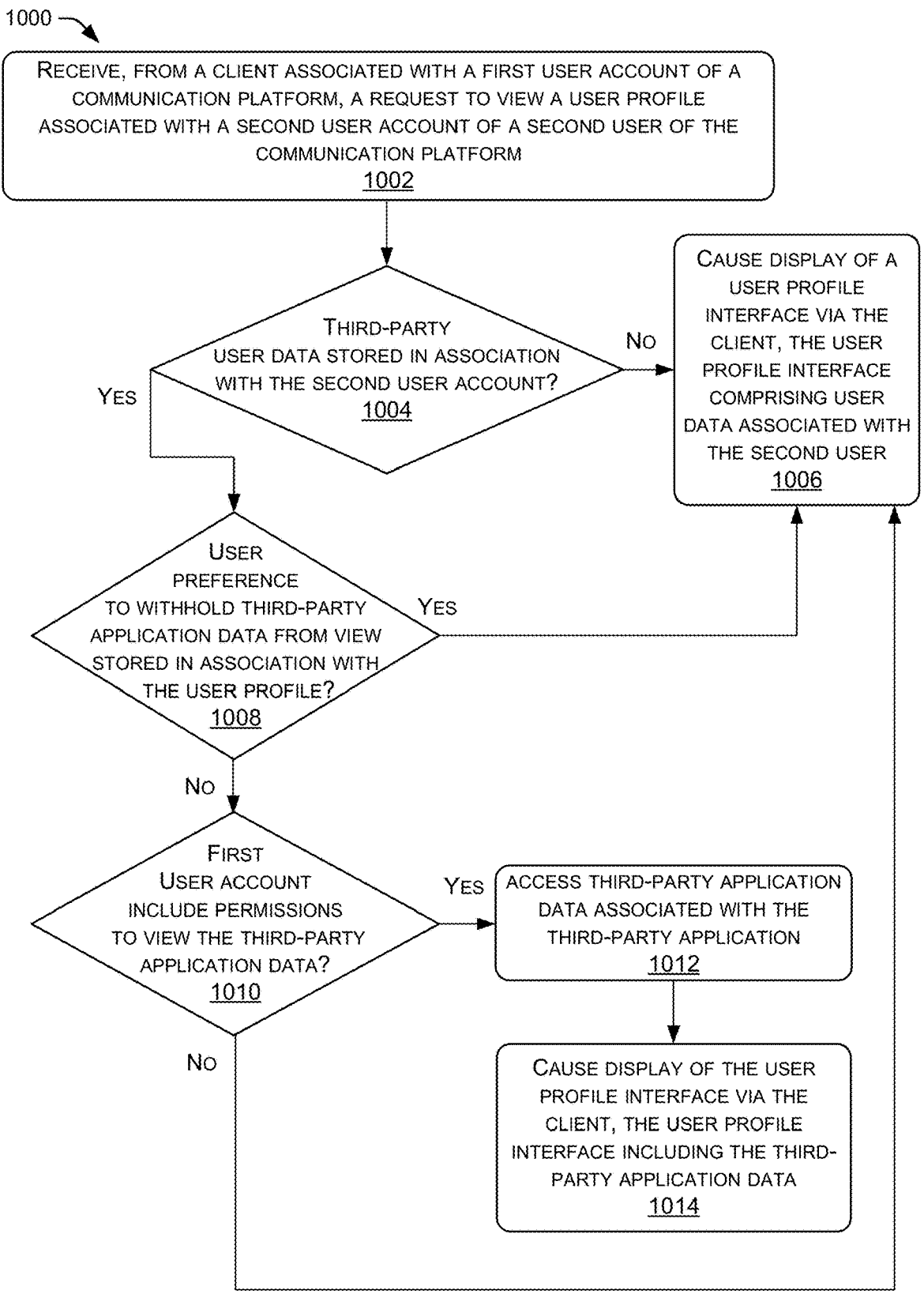
FIG. 10 illustrates an example process for identifying a third-party application, for presentation in association with an enhanced user profile, as described herein.

FIG. 10 illustrates an example process 1000 for identifying a third-party application, for presentation in association with an enhanced user profile, as described herein.

At operation 1002, the server 102 receives, from a client associated with the first user account of a communication platform, a request to view a user profile associated with a second user account of a second user of the communication platform. In various examples, the request to view the user profile can be submitted via a directory interface, such as directory interface 218 and/or an organization page, such as organization page 302. In some examples, the request can be received based on an indication of selection of an indicator associated with the second user, such as in a directory (e.g., directory 306). In some examples, the request to view the user profile can be submitted via a search mechanism, such as search mechanism 220. In such examples, the request can include a submission of a name, contact information, or other identifier associated with the second user.

At operation 1004, the server 102 determines whether there is third-party user data stored in association with the second user account. In various examples, the server 102 analyzes the second user account to determine whether third-party user data, such as third-party user data 130 is stored in association therewith.

Based on a determination that there is not third-party user data stored in association with the second user account ("No" at operation 1004), the server 102, at operation 1006, causes display of a user profile interface via the client, the user profile interface including user data associated with the second user. As described above, the user profile interface can additionally include one or more communication objects associated with the second user account, one or more additional contacts associated with the second user account, and/or one or more inferred characteristics associated with the second user account.

Based on a determination that third-party application data is stored in association with the second user account ("Yes" at operation 1004), the server 102, at operation 1008, determines whether a user preference to withhold third-party application data from view is stored in association with the user profile. In various examples, the second user account can have associated therewith one or more preferences associated with a presentation of data via an enhanced user profile. In such examples, the preference(s) can include preferences to include or withhold data from view via the enhanced user profile. For example, the preferences can include a preference to include communication objects associated with the second user account and to withhold from view any inferred characteristics associated with the second user that are identified by the server 102.

Based on a determination that a user preference to withhold the third-party application data from view is stored in association with the user profile ("Yes" at operation 1008), the server 102 causes display of a user profile interface via the client, the user profile interface including user data associated with the second user, as described at operation 1006.

Based on a determination that no user preference to withhold the third-party application data from view is stored in association with the user profile ("No" at operation 1008), the server 102, at operation 1010, determines whether the first user account includes permissions to view the third-party application data. In various examples, the server 102 can determine the permissions based on user data associated with the first user account, such as a title, position, relationship with the second user, or the like. In some examples, the server 102 can determine the permissions based on a determination that the first user account has stored in association therewith third-party user data corresponding to the third-party application. That is, the server 102 may determine that the first user account has permission to view third-party application data based on a determination that the first user account is also associated (e.g., has a third-party user account) with the third-party application.

Based on a determination that the first user account does not include permissions to view the third-party application data ("No" at operation 1010), the server 102 causes display of a user profile interface via the client, the user profile interface including user data associated with the second user, as described at operation 1006.

Based on a determination that the first user account includes permissions to view the third-party application data ("Yes" at operation 1010), the server 102, at operation 1012, accesses the third-party application data associated with the third-party application. In some examples, the server 102 can access the third-party application data stored in association with the second user account, such as in the third-party user data 130 associated with the datastore 126. In some examples, the server 102 can access the third-party application data stored in association with a third-party user account 132 managed by a third-party service provider 108, such as by utilizing an API or other interface. In such examples, the server 102 can send a request for data to the third-party service provider 108 and can cause a presentation of the data provided by the third-party service provider 108.

At operation 1014, the server 102 causes display of the user profile interface via the client, the user profile interface including the third-party application data. As discussed above, the third-party application data presented via the user profile interface can be interactive. For example, the first user can interact with third-party application data associated with a scheduling application, such as to schedule an appointment with the second user utilizing the third-party application accessed via the user profile interface (e.g., as described above with regard to FIG. 2C).

Figure 11:
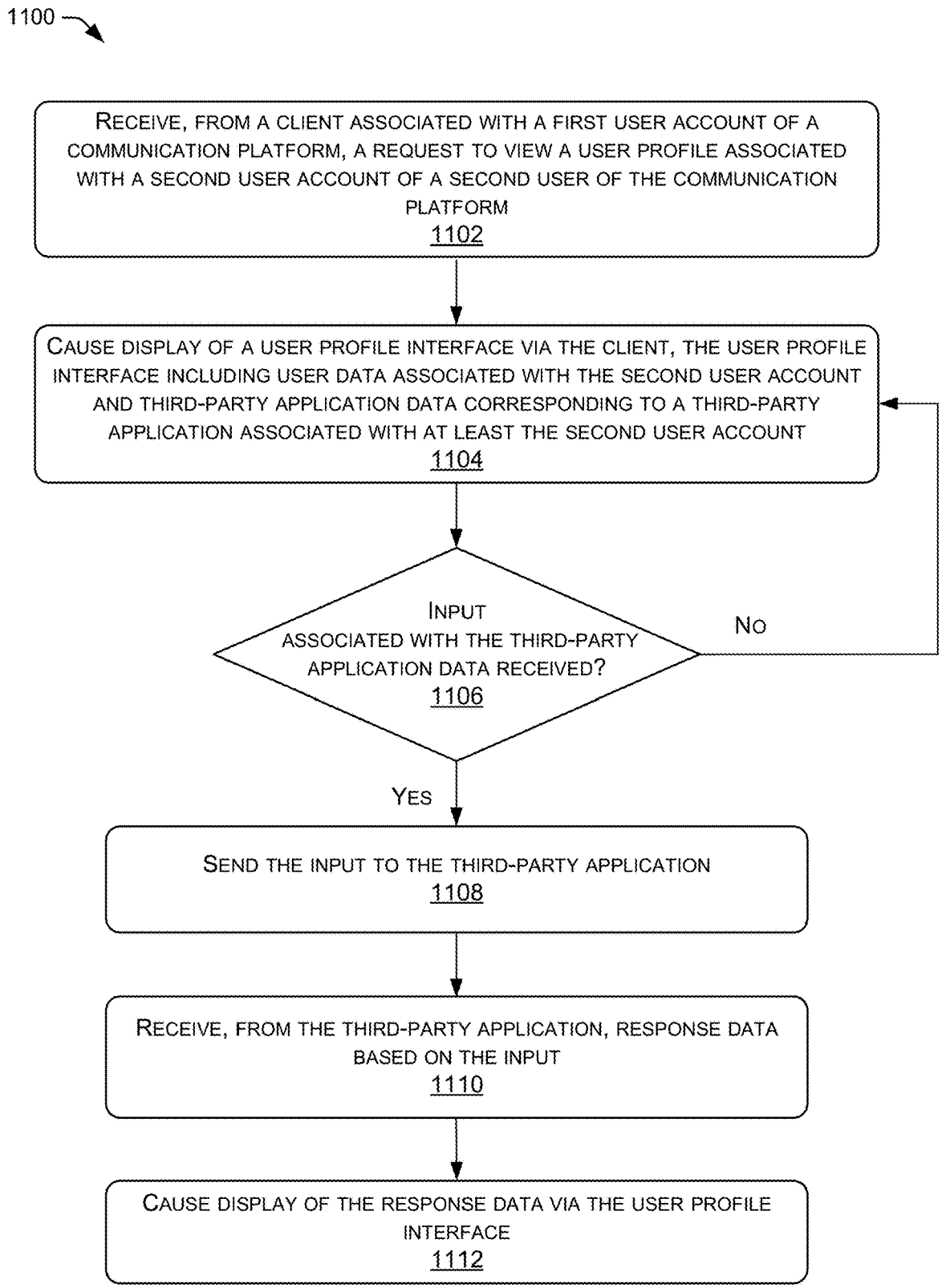
FIG. 11 illustrates an example process for enabling interaction with a third-party application via an enhanced user profile, as described herein.

FIG. 11 illustrates an example process 1100 for enabling interaction with a third-party application via an enhanced user profile, as described herein.

At operation 1102, the server 102 receives, from a client associated with a first user account of a communication platform, a request to view a user profile associated with a second user account of a second user of the communication platform. In various examples, the request to view the user profile can be submitted via a directory interface, such as directory interface 218 and/or an organization page, such as organization page 302. In some examples, the request can be received based on an indication of selection of an indicator associated with the second user, such as in a directory (e.g., directory 306). In some examples, the request to view the user profile can be submitted via a search mechanism, such as search mechanism 220. In such examples, the request can include a submission of a name, contact information, or other identifier associated with the second user.

At operation 1104, the server 102 causes display of a user profile interface via the client, the user profile interface including user data associated with the second user account and third-party application data corresponding to a third-party application associated with at least the second user account. In some examples, the third-party application can additionally be associated with the first user account. As described above, the third-party application data may be obtained from a third-party service provider 108 and/or stored as third-party user data 130 associated with the second user account in a datastore 126 associated with the server 102.

At operation 1106, the server 102 determines whether input associated with the third-party application data is received. As discussed above, the first user can interact with the third-party application data via the user profile interface. In some examples, the input can include a request to view additional third-party application data. In some examples, the input can include a request to view particular third-party application data, such as a calendar associated with a third-party scheduling application, a particular service ticket associated with a service ticket generation application, or the like.

Based on a determination that the input is not received ("No" at operation 1106), the server 102 causes display of a user profile interface via the client, such as that described with respect to operation 1104.

Based on a determination that the input is received ("Yes" at operation 1106), the server 102, at operation 1108 sends the input to the third-party application. As discussed above, the input can include a request to view particular third-party application data. In some examples, the server 102 identifies the third-party service provider 108 associated with the third-party application data and sends the input to a third-party computing device 106 associated therewith. In some examples, the server 102 can utilize an API or other interface to obtain data from the third-party service provider 108 (e.g., third-party application). In some examples, the server 102 can utilize credentialing data associated with a third-party user account 132 associated with the second user account (e.g., stored in association with, such as in third-party user data 130) to obtain the data from the third-party application.

At operation 1110, the server 102 receives, from the third-party application (e.g., third-party computing device 106), response data based on the input. The response can include third-party user data and/or third-party application data associated with the second user. For example, the response can include data associated with a calendar of the second user, such as that managed by a third-party scheduling application. For another example, the response can include data associated with a customer relationship management application, such as data associated with one or more customer relationship accounts managed by the second user.

At operation 1112, the server 102 causes display of the response data via the user profile interface. In some examples, the response data can be presented in a window, such as application data window 240. In some examples, the response data can be presented via the user profile interface, such as in a bifurcated display with the user data and/or other data associated with the user profile of the second user.

Figure 12:
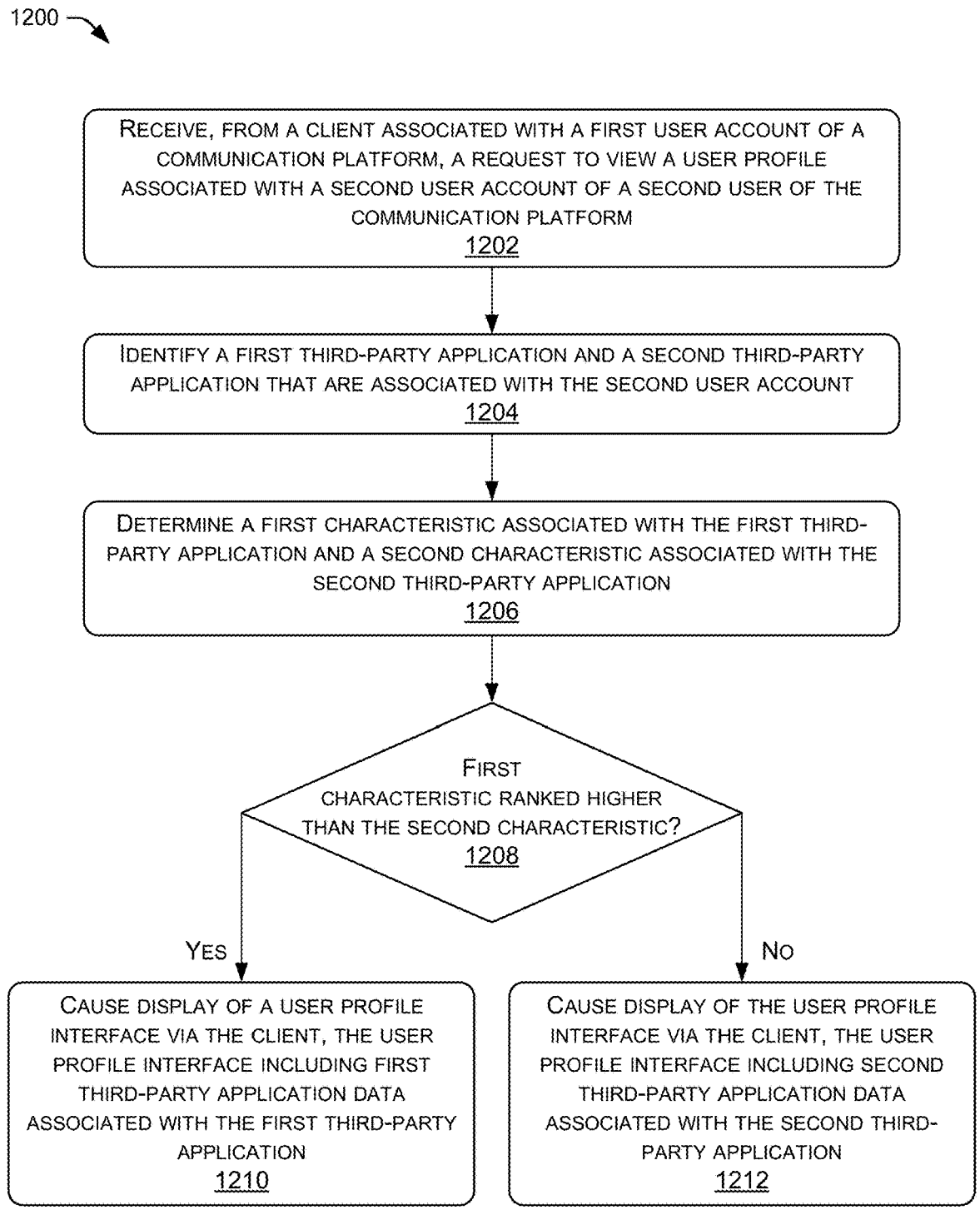
FIG. 12 illustrates an example process for ranking third-party applications to determine a third-party application to present in association with an enhanced user profile, as described herein.

FIG. 12 illustrates an example process 1200 for ranking third-party applications to determine a third-party application to present in association with an enhanced user profile, as described herein.

At operation 1202, the server 102 receives, from a client associated with a first user account of a communication platform, a request to view a user profile associated with a second user account of a second user of the communication platform. In various examples, the request to view the user profile can be submitted via a directory interface, such as directory interface 218 and/or an organization page, such as organization page 302. In some examples, the request can be received based on an indication of selection of an indicator associated with the second user, such as in a directory (e.g., directory 306). In some examples, the request to view the user profile can be submitted via a search mechanism, such as search mechanism 220. In such examples, the request can include a submission of a name, contact information, or other identifier associated with the second user.

At operation 1204, the server 102 identifies a first third-party application and a second third-party application that are associated with the second user account. In various examples, the server 102 can identify the first third-party application and the second third-party application based on data stored in association with the second user account (e.g., third-party user data 130 stored in association with the second user account).

At operation 1206, the server 102 determines a first characteristic associated with the first third-party application and a second characteristic associated with the second third-party application. The characteristics of the respective applications can include a number of interactions, a frequency of interactions, whether the interactions are work-related interactions and/or personal interactions, recency of interactions, and the like.

At operation 1208, the server 102 determines whether the first characteristic is ranked higher than the second characteristic. In some examples, the ranking can be based on a comparison of values associated with the characteristics. For example, the ranking can be determined based on a frequency of work-related interactions. For another example, the ranking can be determined based on a total number of interactions over a period of time.

In some examples, the ranking may be determined based on weighted characteristics. In such examples, the server 102 can determine a first set of characteristics associated with the first third-party application and a second set of characteristics associated with the second third-party application. The server 102 can apply a weight to each characteristic of the first set of characteristics and the second set of characteristics to determine total values associated with the respective third-party applications. The weights can be determined based on a determined level of importance of each characteristic. For example, a recency of interaction with the third-party application may be assessed a weight of (0.7) while a frequency of interaction may be assessed a weight of (0.8), though this is merely an example and is not intended to be so limiting.

Based on a determination that the first characteristic is ranked higher than the second characteristic ("Yes" at operation 1208), the server 102, at operation 1210 causes display of a user profile interface via the client, the user profile interface including first third-party application data associated with the first third-party application. Additionally, the user profile interface can include user data, communication object data, additional contacts, inferred characteristics of the second user, and the like, as discussed herein.

Based on a determination that the second characteristic is ranked higher than the first characteristic ("No" at operation 1208), the server 102, at operation 1212 causes display of the user profile interface via the client, the user profile interface including second third-party application data associated with the second third-party application.

Though described as displaying the first third-party application data or the second third-party application data, this is merely for illustrative purposes and is not intended to be limited to a presentation of data associated with a single application. For example, the first third-party application can represent a first set of one or more third-party applications and the second third-party application can represent a second set of one or more third-party applications. In some examples, a number of third-party application and data associated therewith that are presented via the user profile interface can be determined based on a number of applications that satisfy a threshold criteria, such as a threshold recency of interaction, frequency of interaction, or the like, as described above. In some examples, the number can be determined based on a threshold number of applications. In some examples, the number can be determined based on an amount of space available on the user profile interface and a layout thereof. In some examples, the number can be determined based on user and/or organizational preferences of the user.

As described above, the techniques described herein provide an enhanced user profile to provide a viewing user with an expedited means for identifying relevant information associated with another user. As such, the enhanced user profile may reduce an amount of computing resource and network bandwidth required to search for relevant information within a communication platform. As such, techniques described herein provide specific, technical solutions to technical problems faced by existing systems, the details of which are described above.

EXAMPLE CLAUSES

A: A method, implemented at least in part by one or more computing devices of a communication platform, comprising: receiving, from a client associated with a first user account of a first user of the communication platform, a request to view a user profile associated with a second user account of a second user of the communication platform; identifying, based at least in part on the request and interaction data associated with at least one of the first user account or the second user account, an object, associated with the communication platform, with which at least the second user account is associated; and causing display of a user interface via the client, the user interface comprising user data associated with the user profile and an indicator associated with the object.

B: The method of paragraph A, wherein the object comprises at least one of: a communication channel; a direct messaging instance; a message; a thread; an audio or video communication interface; or a workspace.

C: The method of either paragraph A or paragraph B, further comprising determining, based at least in part on the interaction data, at least one of: a recency of interaction of the second user account with the object; a frequency of interaction of the second user account with the object; or a recency of transmitting, from the second user account, a communication via the object.

D: The method of any one of paragraphs A-C, wherein causing the display of the indicator associated with the object is based at least in part on a determination that the first user account is associated with one or more permissions that enable the first user to access content associated with the object.

E: The method of any one of paragraphs A-D, wherein the user interface further comprises a search mechanism, the method further comprising: receiving, via the search mechanism, a keyword associated with a previous communication with which the second user is associated; and identifying the previous communication based at least in part on the keyword, wherein the object is identified further based at least in part on the previous communication.

F: The method of any one of paragraphs A-E, further comprising: identifying a third user account associated with a third user; and causing, based at least in part on a determination that a frequency of interactions between the second user account and the third user account is above a threshold frequency, display of an indication that the second user frequently interacts with the third user.

G: The method of any one of paragraphs A-F, further comprising: processing interactions between the second user account and one or more other user accounts of the communication platform; determining context data associated with the interactions; determining, based at least in part on the context data, a characteristic associated with the second user; and causing the characteristic to be presented via the user interface in association with the user profile.

H: A system comprising: one or more processors; and one or more non-transitory computer readable media storing instructions that, when executed, cause the system to: receive, from a client associated with a first user account of a first user of the communication platform, a request to view a user profile associated with a second user account of a second user of a communication platform; identify, based at least in part on the request and interaction data associated with at least one of the first user account or the second user account, an object associated with the communication platform, with which at least the second user account is associated; and cause a display of a user interface via the client, the user interface comprising user data associated with the user profile and an indicator associated with the object.

I: The system of paragraph H, wherein the object comprises at least one of: a communication channel; a direct messaging instance; a message; a thread; an audio or video communication interface; or a workspace.

J: The system of either paragraph H or paragraph I, wherein the instructions further cause the system to determine, based at least in part on the interaction data, at least one of: a recency of interaction of the second user account with the object; a frequency of interaction of the second user account with the object; or a recency of transmitting, from the second user account, a communication via the object.

K: The system of any one of paragraphs H-J, wherein causing the display of the indicator associated with the object is based at least in part on a determination that the first user account is associated with one or more permissions that enable the first user to access content associated with the object.

L: The system of any one of paragraphs H-K, wherein the user interface further comprises a search mechanism and the instructions further cause the system to: receive, via the search mechanism, a keyword associated with a previous communication with which the second user is associated; and identify the previous communication based at least in part on the keyword, wherein the object is identified further based at least in part on the previous communication.

M: The system of any one of paragraphs H-L, wherein the instructions further cause the system to: identify a third user account associated with a third user; and cause, based at least in part on a determination that a frequency of interactions between the second user account and the third user account is above a threshold frequency, display of an indication that the second user frequently interacts with the third user.

N: The system of any one of paragraphs H-M, wherein the instructions further cause the system to: process interactions between the second user account and one or more other user accounts of the communication platform; determine context data associated with the interactions; determine, based at least in part on the context data, a characteristic associated with the second user; and cause the characteristic to be presented via the user interface in association with the user profile.

O: One or more non-transitory computer readable media storing instructions that, when executed, cause one or more processors to: receive, from a client associated with a first user account of a first user of the communication platform, a request to view a user profile associated with a second user account of a second user of a communication platform; identify, based at least in part on the request and interaction data associated with at least one of the first user account or the second user account, an object associated with the communication platform, with which at least the second user account is associated; and cause a display of a user interface via the client, the user interface comprising user data associated with the user profile and an indicator associated with the object.

P: The one or more non-transitory computer readable media of paragraph O, wherein the object comprises at least one of: a communication channel; a direct messaging instance; a message; a thread; an audio or video communication interface; or a workspace.

Q: The one or more non-transitory computer readable media of either paragraph O or paragraph P, wherein the instructions further cause the one or more processors to determine, based at least in part on the interaction data, at least one of: a recency of interaction of the second user account with the object; a frequency of interaction of the second user account with the object; or a recency of transmitting, from the second user account, a communication via the object.

R: The one or more non-transitory computer readable media of any one of paragraphs O-Q, wherein causing the display of the indicator associated with the object is based at least in part on a determination that the first user account is associated with one or more permissions that enable the first user to access content associated with the object.

S: The one or more non-transitory computer readable media of any one of paragraphs O-R, wherein the user interface further comprises a search mechanism and wherein the instructions further cause the one or more processors to: receive, via the search mechanism, a keyword associated with a previous communication with which the second user is associated; and identify the previous communication based at least in part on the keyword, wherein the object is identified further based at least in part on the previous communication.

T: The one or more non-transitory computer readable media of any one of paragraphs O-S, wherein the instructions further cause the one or more processors to: identify a third user account associated with a third user; and cause, based at least in part on a determination that a frequency of interactions between the second user account and the third user account is above a threshold frequency, display of an indication that the second user frequently interacts with the third user.

U: A method, implemented at least in part by one or more computing devices of a communication platform, comprising: receiving, from a client associated with a first user account of a first user of the communication platform, a request to view a user profile associated with a second user account of a second user of the communication platform; based at least in part on the request, identifying a third-party application associated with the first user account and the second user account; accessing third-party application data associated with a third-party account corresponding to the second user; and causing display of a user profile interface via the client, the user profile interface comprising user data associated with the user profile and the third-party application data.

V: The method of paragraph U, further comprising: receiving, from the client and via the user profile interface, an input associated with the third-party application data; sending the input to the third-party application; receiving response data based at least in part on the input; and causing display of the response data via the user profile interface.

W: The method of either paragraph U or paragraph V, further comprising: identifying a first characteristic associated with the first user account and a second characteristic associated with the second user account; identifying a relationship between the first user and the second user based at least in part on the first characteristic and the second characteristic; and determining, based at least in part on the relationship, that the first user account is permitted access to the third-party application data, wherein accessing the third-party application data is based at least in part on a determination that the first user account is permitted access to the third-party application data.

X: The method of any one of paragraphs U-W, wherein the third-party application is a first third-party application, the method further comprising: identifying a second third-party application associated with the second user account; determining that a user preference associated with the first user account includes a preference to not view data associated with the second third-party application; and in response to a determination that the user preference includes the preference to not view the data, withholding the data associated with the second third-party application from being presented via the user profile interface.

Y: The method of any one of paragraphs U-X, further comprising: determining that a user preference associated with the second user account includes a preference to not publish first data associated with the third-party application; and in response to a determination that the user preference includes the preference to not publish the first data, withholding the first data from being presented via the user profile interface, wherein the third-party application data comprises second data associated with the third-party application.

Z: The method of any one of paragraphs U-Y, wherein the third-party application is a first third-party application, the method further comprising: identifying a second third-party application associated with the second user account; determining a first characteristic associated with the first third-party application and second characteristic associated with the second third-party application; and ranking the first third-party application and the second third-party application based at least in part on the first characteristic and the second characteristic, wherein causing the display of the first third-party application is based at least in part on the ranking.

AA: The method of paragraph Z, wherein the first characteristic and the second characteristic comprise at least one of: a frequency of use of respective third-party applications; a recency of use of the respective third-party applications; a priority indication associated with respective third-party application data associated with the respective third-party applications; or a level of interaction that is enabled by the respective third-party applications.

AB: A system comprising: one or more processors; and one or more non-transitory computer readable media storing instructions that, when executed, cause the system to: receive, from a client associated with a first user account of a first user of the communication platform, a request to view a user profile associated with a second user account of a second user of a communication platform; based at least in part on the request, identify a third-party application associated with the first user account and the second user account; access third-party application data associated with a third-party account corresponding to the second user; and cause display of a user profile interface via the client, the user profile interface comprising user data associated with the user profile and the third-party application data.

AC: The system of paragraph AB, wherein the instructions further cause the system to: receive, from the client and via the user profile interface, an input associated with the third-party application data; send the input to the third-party application; receive response data based at least in part on the input; and cause display of the response data via the user profile interface.

AD: The system of either paragraph AB or paragraph AC, wherein the instructions further cause the system to: identify a first characteristic associated with the first user account and a second characteristic associated with the second user account; identify a relationship between the first user and the second user based at least in part on the first characteristic and the second characteristic; and determine, based at least in part on the relationship, that the first user account is permitted access to the third-party application data, wherein accessing the third-party application data is based at least in part on a determination that the first user account is permitted access to the third-party application data.

AE: The system of any one of paragraphs AB-AD, wherein the third-party application is a first third-party application, and wherein the instructions further cause the system to identify a second third-party application associated with the second user account; determine that a user preference associated with the first user account includes a preference to not view data associated with the second third-party application; and in response to a determination that the user preference includes the preference to not view the data, withhold the data associated with the second third-party application from being presented via the user profile interface.

AF: The system of any one of paragraphs AB-AE, wherein the instructions further cause the system to: determine that a user preference associated with the second user account includes a preference to not publish first data associated with the third-party application; and in response to a determination that the user preference includes the preference to not publish the first data, withhold the first data from being presented via the user profile interface, wherein the third-party application data comprises second data associated with the third-party application.

AG: The system of any one of paragraphs AB-AF, wherein the third-party application is a first third-party application, and wherein the instructions further cause the system to: identify a second third-party application associated with the second user account; determine a first characteristic associated with the first third-party application and second characteristic associated with the second third-party application; and rank the first third-party application and the second third-party application based at least in part on the first characteristic and the second characteristic, wherein causing the display of the first third-party application is based at least in part on the ranking.

AH: The system of paragraph AG, wherein the first characteristic and the second characteristic comprise at least one of: a frequency of use of respective third-party applications; a recency of use of the respective third-party applications; a priority indication associated with respective third-party application data associated with the respective third-party applications; or a level of interaction that is enabled by the respective third-party applications.

AI: One or more non-transitory computer readable media storing instructions that, when executed, cause one or more processors to: receive, from a client associated with a first user account of a first user of the communication platform, a request to view a user profile associated with a second user account of a second user of a communication platform; based at least in part on the request, identify a third-party application associated with the first user account and the second user account; access third-party application data associated with a third-party account corresponding to the second user; and cause display of a user profile interface via the client, the user profile interface comprising user data associated with the user profile and the third-party application data.

AJ: The one or more non-transitory computer readable media of paragraph AI, wherein the instructions further cause the one or more processors to: receive, from the client and via the user profile interface, an input associated with the third-party application data; send the input to the third-party application; receive response data based at least in part on the input; and cause display of the response data via the user profile interface.

AK: The one or more non-transitory computer readable media of either paragraph AI or paragraph AJ, wherein the instructions further cause the one or more processors to: identify a first characteristic associated with the first user account and a second characteristic associated with the second user account; identify a relationship between the first user and the second user based at least in part on the first characteristic and the second characteristic; and determine, based at least in part on the relationship, that the first user account is permitted access to the third-party application data, wherein accessing the third-party application data is based at least in part on a determination that the first user account is permitted access to the third-party application data.

AL: The one or more non-transitory computer readable media of any one of paragraphs AI-AK, wherein the third-party application is a first third-party application, and wherein the instructions further cause the one or more processors to: identify a second third-party application associated with the second user account; determine that a user preference associated with the first user account includes a preference to not view data associated with the second third-party application; and in response to a determination that the user preference includes the preference to not view the data, withhold the data associated with the second third-party application from being presented via the user profile interface.

AM: The one or more non-transitory computer readable media of any one of paragraphs AI-AL, wherein the instructions further cause the one or more processors to: determine that a user preference associated with the second user account includes a preference to not publish first data associated with the third-party application; and in response to a determination that the user preference includes the preference to not publish the first data, withhold the first data from being presented via the user profile interface, wherein the third-party application data comprises second data associated with the third-party application.

AN: The one or more non-transitory computer readable media of any one of paragraphs AI-AM, wherein the third-party application is a first third-party application, and wherein the instructions further cause the one or more processors to: identify a second third-party application associated with the second user account; determine a first characteristic associated with the first third-party application and second characteristic associated with the second third-party application; and rank the first third-party application and the second third-party application based at least in part on the first characteristic and the second characteristic, wherein causing the display of the first third-party application is based at least in part on the ranking.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, comprising:
    receiving, from a client associated with a first user account of a first user of the communication platform, a request to view a user profile associated with a second user account of a second user of the communication platform;
    identifying, based at least in part on the request and interaction data associated with at least one of the first user account or the second user account, an object with which at least the second user account is associated, wherein the object is identified based at least in part on a determination that interactions of the second user with the object meet or exceed a threshold level of interactions; and
    causing display of a user interface via the client, the user interface comprising user data associated with the user profile and an indicator associated with the object.

2. The method of claim 1, wherein the object comprises at least one of:
    a communication channel;
    a direct messaging instance;
    a message;
    a thread;
    an audio or video communication interface; or
    a workspace.

3. The method of claim 1, further comprising determining, based at least in part on the interaction data, at least one of:
- a first recency of the interactions of the second user account with the object;
- a frequency of the interactions of the second user account with the object; or
- a second recency of transmitting, from the second user account, a communication via the object.

4. The method of claim 1, wherein causing the display of the indicator associated with the object is based at least in part on a second determination that the first user account is associated with one or more permissions that enable the first user to access content associated with the object.

5. The method of claim 1, wherein the user interface further comprises a search mechanism, the method further comprising:
- receiving, via the search mechanism, a keyword associated with a previous communication with which the second user is associated; and
- identifying the previous communication based at least in part on the keyword,
- wherein the object is identified further based at least in part on the previous communication.

6. The method of claim 1, wherein the interactions are first interactions, further comprising:
- identifying a third user account associated with a third user; and
- causing, based at least in part on a second determination that a frequency of second interactions between the second user account and the third user account is above a threshold frequency, display of an indication that the second user frequently interacts with the third user.

7. The method of claim 1, further comprising:
- processing second interactions between the second user account and one or more other user accounts of the communication platform;
- determining context data associated with the second interactions;
- determining, based at least in part on the context data, a characteristic associated with the second user; and
- causing the characteristic to be presented via the user interface in association with the user profile.

8. A system comprising:
- one or more processors; and
- one or more non-transitory computer readable media storing instructions that, when executed, cause the system to:
  - receive, from a client associated with a first user account of a first user of a communication platform, a request to view a user profile associated with a second user account of a second user of the communication platform;
  - identify, based at least in part on the request and interaction data associated with at least one of the first user account or the second user account, an object associated with the communication platform, with which at least the second user account is associated, wherein the object is identified based at least in part on a determination that interactions of the second user with the object meet or exceed a threshold level of interactions; and
  - cause a display of a user interface via the client, the user interface comprising user data associated with the user profile and an indicator associated with the object.

9. The system of claim 8, wherein the object comprises at least one of:
- a communication channel;
- a direct messaging instance;
- a message;
- a thread;
- an audio or video communication interface; or
- a workspace.

10. The system of claim 8, wherein the instructions further cause the system to determine, based at least in part on the interaction data, at least one of:
- a first recency of the interactions of the second user account with the object;
- a frequency of the interactions of the second user account with the object; or
- a second recency of transmitting, from the second user account, a communication via the object.

11. The system of claim 8, wherein causing the display of the indicator associated with the object is based at least in part on a second determination that the first user account is associated with one or more permissions that enable the first user to access content associated with the object.

12. The system of claim 8, wherein the user interface further comprises a search mechanism and the instructions further cause the system to:
- receive, via the search mechanism, a keyword associated with a previous communication with which the second user is associated; and
- identify the previous communication based at least in part on the keyword,
- wherein the object is identified further based at least in part on the previous communication.

13. The system of claim 8, wherein the instructions further cause the system to:
- identify a third user account associated with a third user; and
- cause, based at least in part on a second determination that a frequency of second interactions between the second user account and the third user account is above a threshold frequency, display of an indication that the second user frequently interacts with the third user.

14. The system of claim 8, wherein the instructions further cause the system to:
- process second interactions between the second user account and one or more other user accounts of the communication platform;
- determine context data associated with the second interactions;
- determine, based at least in part on the context data, a characteristic associated with the second user; and
- cause the characteristic to be presented via the user interface in association with the user profile.

15. One or more non-transitory computer readable media storing instructions that, when executed, cause one or more processors to:
- receive, from a client associated with a first user account of a first user of a communication platform, a request to view a user profile associated with a second user account of a second user of the communication platform;
- identify, based at least in part on the request and interaction data associated with at least one of the first user account or the second user account, an object associated with the communication platform, with which at least the second user account is associated, wherein the object is identified based at least in part on a determination that interactions of the second user with the object meet or exceed a threshold level of interactions; and cause a display of a user interface via the client, the user interface comprising user data associated with the user profile and an indicator associated with the object.

16. The one or more non-transitory computer readable media of claim 15, wherein the object comprises at least one of:
   a communication channel;
   a direct messaging instance;
   a message;
   a thread;
   an audio or video communication interface; or
   a workspace.

17. The one or more non-transitory computer readable media of claim 15, wherein the instructions further cause the one or more processors to determine, based at least in part on the interaction data, at least one of:
   a first recency of the interactions of the second user account with the object;
   a frequency of the interactions of the second user account with the object; or
   a second recency of transmitting, from the second user account, a communication via the object.

18. The one or more non-transitory computer readable media of claim 15, wherein causing the display of the indicator associated with the object is based at least in part on a second determination that the first user account is associated with one or more permissions that enable the first user to access content associated with the object.

19. The one or more non-transitory computer readable media of claim 15, wherein the user interface further comprises a search mechanism and wherein the instructions further cause the one or more processors to:
   receive, via the search mechanism, a keyword associated with a previous communication with which the second user is associated; and
   identify the previous communication based at least in part on the keyword,
   wherein the object is identified further based at least in part on the previous communication.

20. The one or more non-transitory computer readable media of claim 15, wherein the instructions further cause the one or more processors to:
   identify a third user account associated with a third user; and
   cause, based at least in part on a second determination that a frequency of second interactions between the second user account and the third user account is above a threshold frequency, display of an indication that the second user frequently interacts with the third user.

* * * * *